United States Patent

[11] 3,601,535

[72] Inventor Robert B. Heick
Eatontown, N.J.
[21] Appl. No. 879,341
[22] Filed Nov. 24, 1969
[45] Patented Aug. 24, 1971
[73] Assignee Bell Telephone Laboratories, Incorporated
Murray Hill, N.J.

[54] MEASUREMENT OF MINIMUM OF A SERIES OF TIME INTERVALS
11 Claims, 29 Drawing Figs.

[52] U.S. Cl. 178/69 A, 179/175.2 A, 328/111, 307/324
[51] Int. Cl. H04l 1/00, H04m 3/22, H04m 1/24
[50] Field of Search 178/69 R, 69 A; 179/175.2 A; 328/111, 130, 162; 307/324

[56] References Cited

UNITED STATES PATENTS

| | | | |
|---|---|---|---|
| 3,025,349 | 3/1962 | Peterson | 178/69 A |
| 3,084,220 | 4/1963 | Britt | 178/69 A |
| 3,182,127 | 5/1965 | Wiese | 178/69 A |
| 3,420,950 | 1/1969 | Britt | 178/69 A |

*Primary Examiner*—Kathleen H. Claffy
*Assistant Examiner*—Douglas W. Olms
*Attorneys*—R. J. Guenther and James Warren Falk

ABSTRACT: The circuit uses digital technique to measure the minimum break (or make) interval over a series of telephone dial pulses. During the first break, clock pulses are serially counted in a binary coded decimal up-counter. At the end of the first break, the up-count is transferred as the same count to a binary coded reentrant decimal down-counter of the same count capacity as the up-counter; and, at the start of the next break, the up-counter is cleared to zero count. During the second (new) break, clock pulses are serially subtracted from the count in the down-counter while being serially counted in the up-counter. If any clock pulses cause the count in the down-counter to go from zero count to capacity count, further up-counting in the up-counter is stopped. After each new measured break, the up-counter contains the minimum of the old and new counts, the minimum count is transferred to the down-counter, the up-counter is cleared to zero count, and the process repeats. Visual display is provided of the minimum count by translation from clock pulse count in the down-counter to milliseconds.

INVENTOR
R. B. HEICK
BY [signature]
ATTORNEY

NAND

NAND

INVERTER

INVERTER

LOGICAL AND

LOGICAL AND

DELAY

DELAY

DELAY

SINGLE SHOT

SINGLE SHOT

SINGLE SHOT

DELAYED SINGLE SHOT

DELAYED SINGLE SHOT

DELAYED SINGLE SHOT

REGENERATION

REGENERATION

REGENERATION

J K FLIP FLOP

D-TYPE FLIP FLOP

DECADE DOWN COUNTER

DECADE DOWN COUNTER

BINARY CODED DECIMAL COUNTER

DECADE UP COUNTER

SIGNALS

MEASUREMENT OF MINIMUM OF A SERIES OF TIME INTERVALS

BACKGROUND OF THE INVENTION

This invention relates generally to the field of time interval measurement and particularly to the measurement of the shortest or minimum time interval among a series of time intervals.

The prior art, such as U.S. Pat. No. 3,084,220 to Britt of Apr. 2, 1963, has generally concerned itself with measuring a series of time intervals while comparing each measurement with a standard minimum time interval and providing some indication, generally by a meter or other visual indicator, of the largest deviation, if any, from that standard minimum. Such prior technique could indicate a minimum of a series of time intervals only if at least one such interval was of less duration than the prescribed standard. While means generally has been provided in such prior circuitry for setting that test standard within limits, such a limit nevertheless precluded the measurement over a series of time intervals of the minimum unless at least one measured time interval was shorter than the prescribed standard.

An application of H. Mann and J. A. Whiteaker Ser. No. 879,283, for "Measurement of Minimum of a Series of Time Intervals," filed Nov. 24, 1969, discloses and claims an arrangement for measuring the minimum of a series of time intervals with the time intervals themselves being the only criteria of that minimum.

The Mann-Whiteaker arrangement uses clock-controlled digital technique to control two binary coded up-counters of the same count capacity. After any measurement, a first counter, which is reentrant, contains the nine's complement of the last clock pulse count in the second counter, and the second counter is cleared to zero count. The next clock pulse count is serially added (complementary addition equals subtraction of new count from old count) to the count in the first counter while being serially added into the cleared second counter. If the first counter exceeds its capacity, further counting is stopped in the second counter, such that the latter contains a pulse count indicative of the minimum measured time interval.

An arrangement like that of Mann and Whiteaker requires that the two counters be engineered so that the registering or counting codes are self-complementing decimal codes to enable the transfer of a count from one counter to the other as the nine's complement in order to enable the nine's complement counter to ascertain, by complementary addition, whether the next count is larger than the previous count.

The present invention provides an arrangement similar to that of Mann and Whiteaker except that the special self-complementing decimal coding is not necessary, thus rendering the equipment engineering less complicated and more economical.

SUMMARY OF THE INVENTION

The present invention contemplates digital technique for using a clock pulse generator to control two pulse count registers such that (1) during the measurement of the first of a series of time intervals one register contains a pulse count of clock pulses occurring during the first time interval, (2) at the end of each measured time interval the other register contains as a starting count the same pulse count then in the one register, (3) during each measured time interval succeeding the first interval clock pulses are serially subtracted from the starting pulse count in the other register, and (4) during each measured time interval succeeding the first interval the pulse count in the one register is made equal to the sum of all clock pulses not exceeding the number required to reduce below zero the dissipative pulse count in the other register.

Particularly, the present invention contemplates clearing the pulse count to zero in the one register prior to measuring each succeeding time interval, serially adding clock pulses into the cleared one register while the same clock pulses are being serially subtracted from the count in the other register, and stopping the counting in the one register if the dissipative count in the other register goes below zero count, such that the one register contains a clock pulse count indicative of the minimum measured time interval.

BRIEF DESCRIPTION OF THE DRAWING

The drawing consists of FIGS. 1 through 29 arranged on seven sheets as follows.

DETAILED DESCRIPTION

The detailed description of the exemplary embodiment is arranged in four main parts: the Circuit Symbols; the Signals; the Block Diagram; and, the Detailed Circuit Disclosure. These parts will be dealt with in the above order under the indicated headings.

CIRCUIT SYMBOLS

Figure 27:
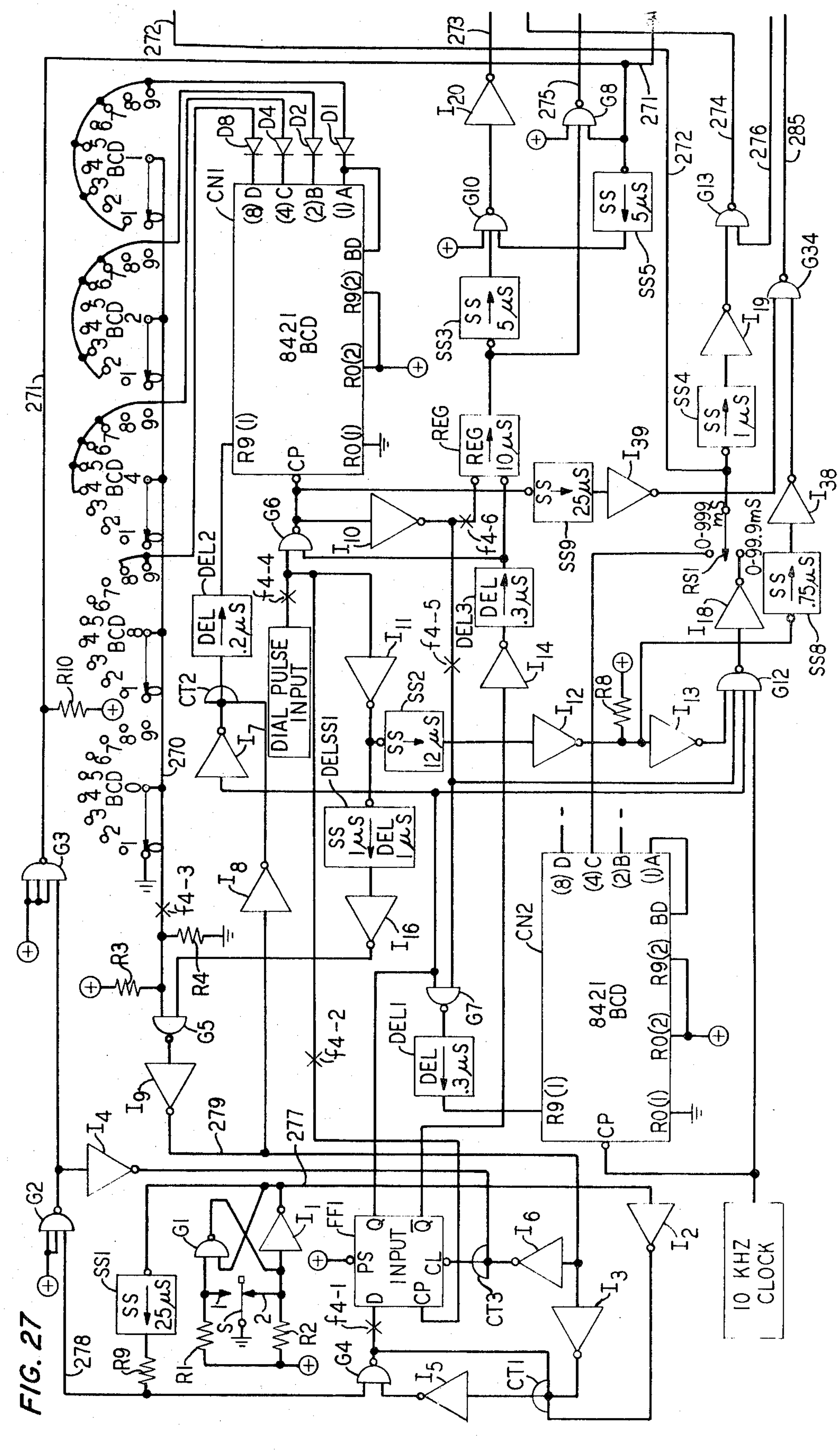
Figure 28:
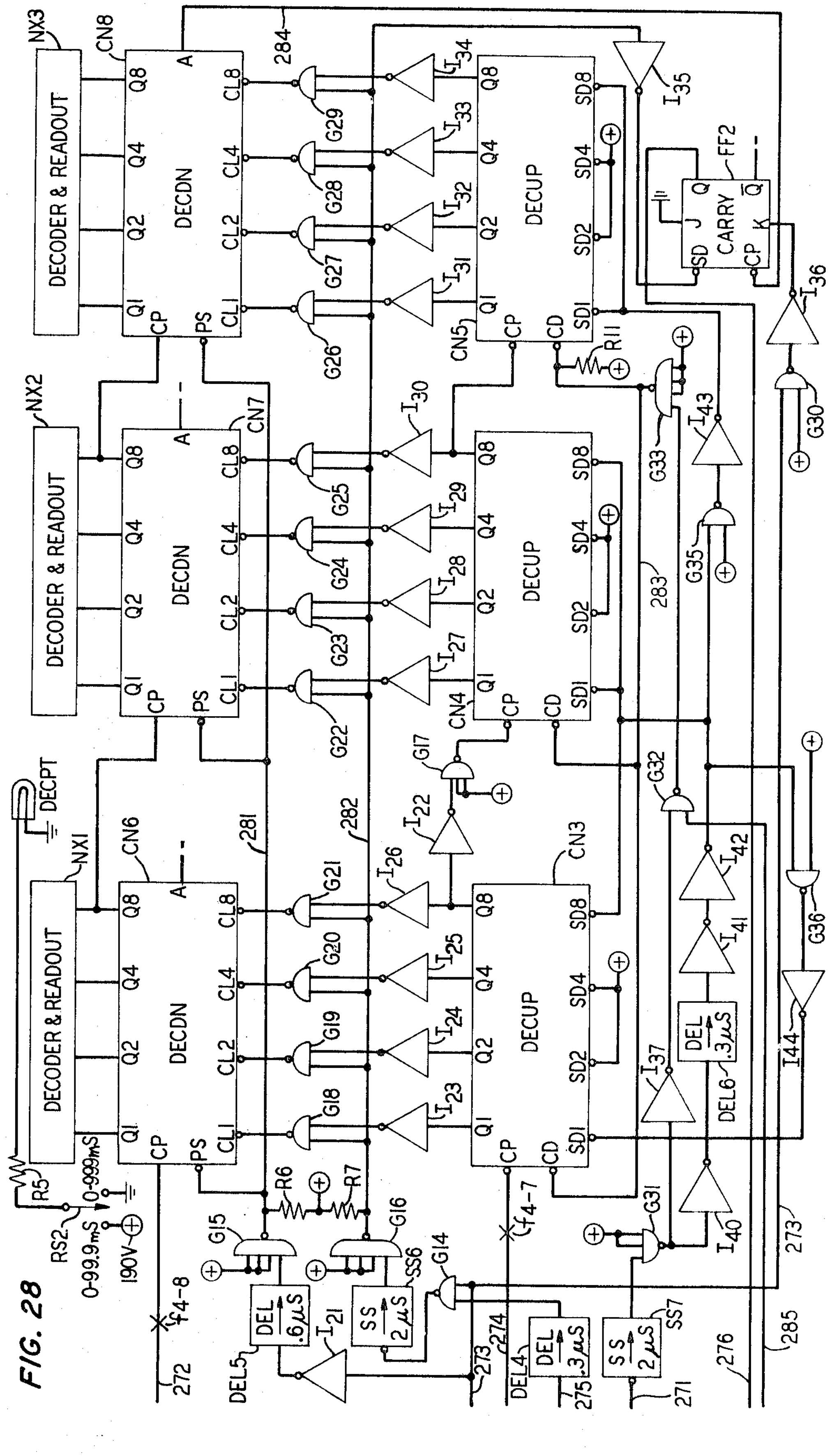

The following, under suitable headings, explain conventions and symbols as used in the detailed circuit layout of FIGS. 27 and 28. In explaining the action of the circuit components, it is assumed that they are connected as shown in FIGS. 27 and 28. The diagrams used to explain the action of the components are not intended to represent true waveforms, but merely to illustrate the logic level functions of the components in the context of FIGS. 27 and 28.

BATTERY AND GROUND

A circle with a plus sign (+) indicates the positive terminal of a source of direct current supply, the negative terminal of which is assumed to be connected to ground, which is considered as zero potential. The direct current voltage is five volts unless otherwise indicated.

DETACHED CONTACTS

A crossmark (X) on a conductor indicates a pair of electrical contacts associated with a switch. The contacts complete the circuit path when the switch is operated and open the circuit when the switch is operated and open the circuit when the switch is not operated (released).

HIGH AND LOW SIGNALS

A potential condition, whether steady or transient, is said to be a high logic level if it is two volts or more positive. A low logic level condition is a voltage not more positive than about one-half of a volt.

NAND GATE

Figure 2:
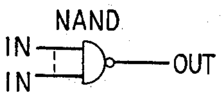
FIGS. 2 through 25 show circuit components and symbols used in the detailed circuitry of FIGS. 27 and 28; and, FIG. 26 is a chart illustrating various aspects of telephone dial pulses used by example as the source of time intervals to be measured.

FIG. 2 shows the symbol for a typical NAND gate such as Motorola integrated circuit MC830 and the like.

Figure 3:
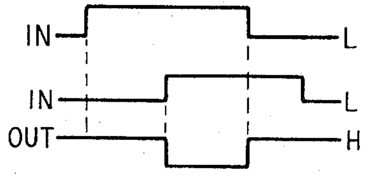

FIG. 3 shows the circuit action of the NAND gate. The output will be low only if all inputs are high: otherwise, the output will be high.

INVERTER

Figure 4:
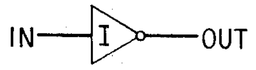

FIG. 4 shows the symbol for a typical inverter such as Motorola integrated circuit MC836 and the like.

Figure 5:
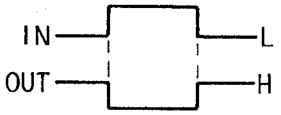

FIG. 5 shows the circuit action of the inverter. The output will be the inverse of the input. That is, a low input produces a high output and a high input produces a low output.

LOGICAL AND

Figure 6:
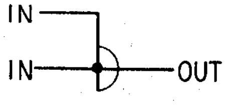

FIG. 6 shows the symbol used to indicate an electrical connection referred to as a "collector tie," which is the electrical paralleling of outputs from two or more NAND gates or inverters or both.

Figure 7:
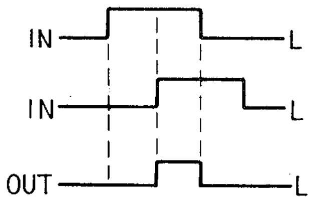

FIG. 7 shows the effect of the logical AND connection. The output is high only when all inputs are high; otherwise, the output is low.

DELAY

Figure 8:
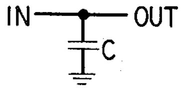

FIG. 8 shows how a capacitor can be connected to a conductor such that a delay is attached to each low-to-high transition. The amount of delay is a function of the value of the capacitor C and the amount and nature of connecting circuits.

Figure 9:
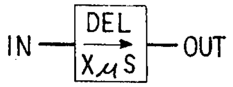

FIG. 9 shows the symbol for a delay circuit with an arrow pointing in the direction of the effect of the delay. The symbol includes the amount of delay (microseconds μs or milliseconds ms.) where pertinent.

Figure 10:
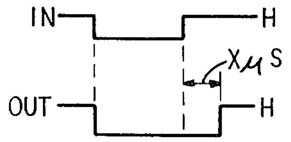

FIG. 10 shows the action of the delay circuit. A low-to-high transition at the input is delayed by $x$ μs at the output due to a controllable charging time of capacitor C. No delay to speak of is experienced at the output by a high-to-low transition at the input since the discharge path of capacitor C is arranged to be very fast. SINGLE-SHOT FIG. 11 shows how a single-shot circuit may be made to produce a high-to-low output of a specified short width from a longer high-to-low input.

Figure 11:
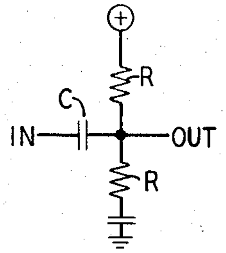
Figure 12:
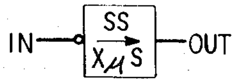

FIG. 12 shows the symbol for a single-shot like that of FIG. 11

Figure 13:
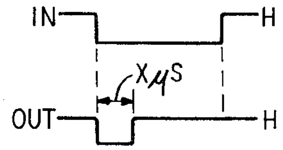

FIG. 13 shows the circuit action of the single-shot. A high-to-low transition at the input will produce at the output a high-to-low transition lasting for $x$ μs. Normally, the output is high by virtue of the resistance divider. Low-to-high transitions at the input will not affect the logic level of the output. However, a high-to-low transition of the input will at once provide a high-to-low transition at the output, followed by a charging time of $x$ μs for condenser C to charge up to the high level.

DELAYED SINGLE-SHOT

Figure 14:
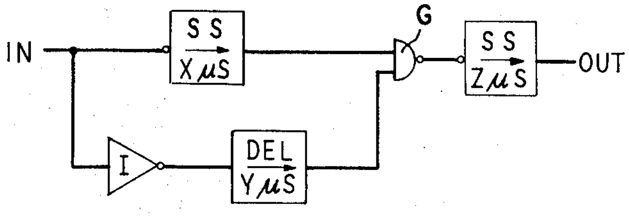

FIG. 14 shows how a delayed single-shot circuit may be made to produce a high-to-low output of a specified short width delayed a specified time from the controlling high-to-low transition of a longer input.

Figure 15:
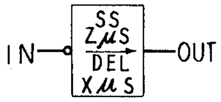

FIG. 15 shows the symbol of a delayed single-shot circuit like FIG. 14.

Figure 16:
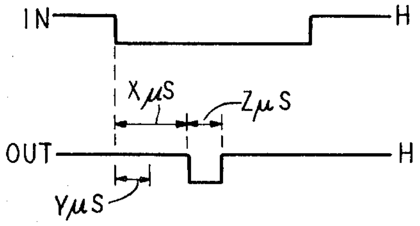

FIG. 16 shows the circuit action of the delayed single-shot. Under steady state conditions, the output is high from the single-shot z, No change at the input, except a high-to-low, will affect the logic level of the output. When a high-to-low input occurs, the upper input of gate G will go low for $x$ μs and then return to high and the lower input of gate G will stay low for $y$ μs and will then go high. When both inputs of gate G go high (at the end of the $x$ μs), the output of gate G will go low to cause the output to produce a single-shot low pulse of $z$ μs. Thus, the high-to-low input has caused to output to delay $x$ μs and then produce a single-shot low of $z$ μs.

REGENERATION

Figure 17:
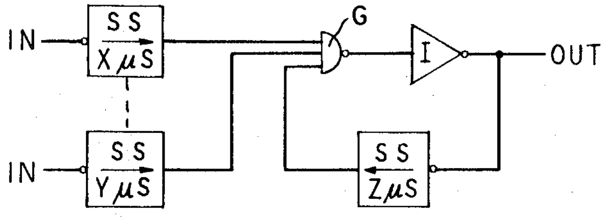

FIG. 17 shows how a regeneration circuit may be made for producing a long high-to-low output from a shorter high-to-low input.

Figure 18:
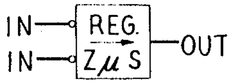

FIG. 18 shows the symbol for a regeneration circuit for producing a pulse of $z$ μs width.

Figure 19:
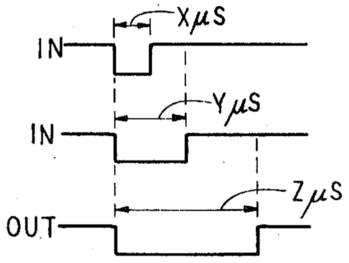

FIG. 19 shows the circuit action of a regeneration circuit like FIG. 17. Under steady state conditions the three inputs to gate G are high, thus producing a low input to the inverter and a high output. No change on any input, except a high-to-low transition, will affect the output. A high-to-low input to single-shot $x$ will produce at the upper input to gate G a high-to-low pulse lasting $x$ μs. Similarly, a high-to-low input to single-shot $y$ will produce at the middle input to gate G a high-to-low pulse lasting $y$ μs. The leading edge (high-to-low) of either of these inputs to gate G will cause the output of gate G to go high and the output of the inverter to go low. The single-shot $z$ will produce at the lower input of gate G a high-to-low pulse lasting $z$ μs, which holds the output of G high and the output of the inverter low until the end of the $z$ μs interval, at which time all three inputs of gate G will again be high. This will cause the output of the inverter to again be high.

JK FLIP-FLOP

Figure 20:
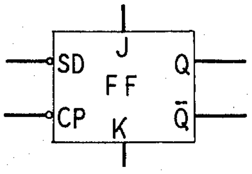

FIG. 20 shows a typical JK flip-flop such as Motorola integrated circuit MC853 and the like. SD is the direct set input, CP is the clock pulse input, Q is the "1" output, and $\overline{Q}$ is the "0" output. Q and $\overline{Q}$ are inversions: $\overline{Q}$ will always be the opposite of Q: if Q changes, $\overline{Q}$ will change. Whenever SD is low, a direct set condition prevails with Q high and $\overline{Q}$ low. Whenever SD is high and CP is low, changes in the J and K information will not affect the state of Q and $\overline{Q}$. Whenever SD is high, a high-to-low transition on CP will change the state of Q and $\overline{Q}$ or not depending upon the condition of inputs J and K. The J and K information is assumed to be changed, if at all, while the CP lead is low. The following indicates the action of the circuit with SD high, the J and K information established, and the CP lead going from high-to-low. If J and K are low, Q does not change, If J is low and K is high, if Q is low it will stay low and if Q is high it will go low. If J is high and K is low, if Q is high it will stay high and if Q is low it will go high. If J and K are high, Q changes (toggles). The above information is summarized in the following table:

| SD | CP | J | K | Q | $\overline{Q}$ |
|---|---|---|---|---|---|
| L | X | X | X | H | L |
| H | L | X | X | √ | √ |
| H | P | L | L | √ | √ |
| H | P | L | H | L/L | H/H |
| H | P | L | H | H/L | L/H |
| H | P | H | L | L/H | H/L |
| H | P | H | L | H/H | L/L |
| H | P | H | H | L/H | H/L |
| H | P | H | H | H/L | L/H |

P . . . means a pulse from high-to-low.
L . . . means low.
H . . means high.
√ . . . means no change of state.
L/H, etc. . . . means a change of state.
H/H, etc. . . . means no change of state.
X . . . means not controlling.

D-TYPE FLIP-FLOP

Figure 21:
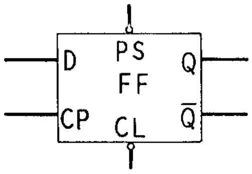

FIG. 21 shows a typical D-type flip-flop such as Texas Instruments integrated circuit SN7474 and the like. D is the data input, CP is the clock pulse input, PS is the preset input, CL is the clear input, Q is the "1" input, and $\overline{Q}$ is the "0" output. With PS low and CL high, a preset condition exists with Q high and $\overline{Q}$ low. With PS high and CL low, a clear condition exists with Q low and $\overline{Q}$ high. With PS high and CL high, Q is made the same as the high or low condition of the D input when CP is pulsed low-to-high. At all other times, Q and $\overline{Q}$ are unaffected by changes on the D input. The following table summarizes the above:

| CP | D | PS | CL | Q | $\overline{Q}$ |
|---|---|---|---|---|---|
| X | X | L | H | H | L |
| X | X | H | L | L | H |
| P | L | H | H | L | H |
| P | H | H | H | H | L |

P . . . means a pulse from low-to-high.
L . . . means low.
H . . . means high.
X . . . means not controlling

DECADE DOWN COUNTER

Figure 22:
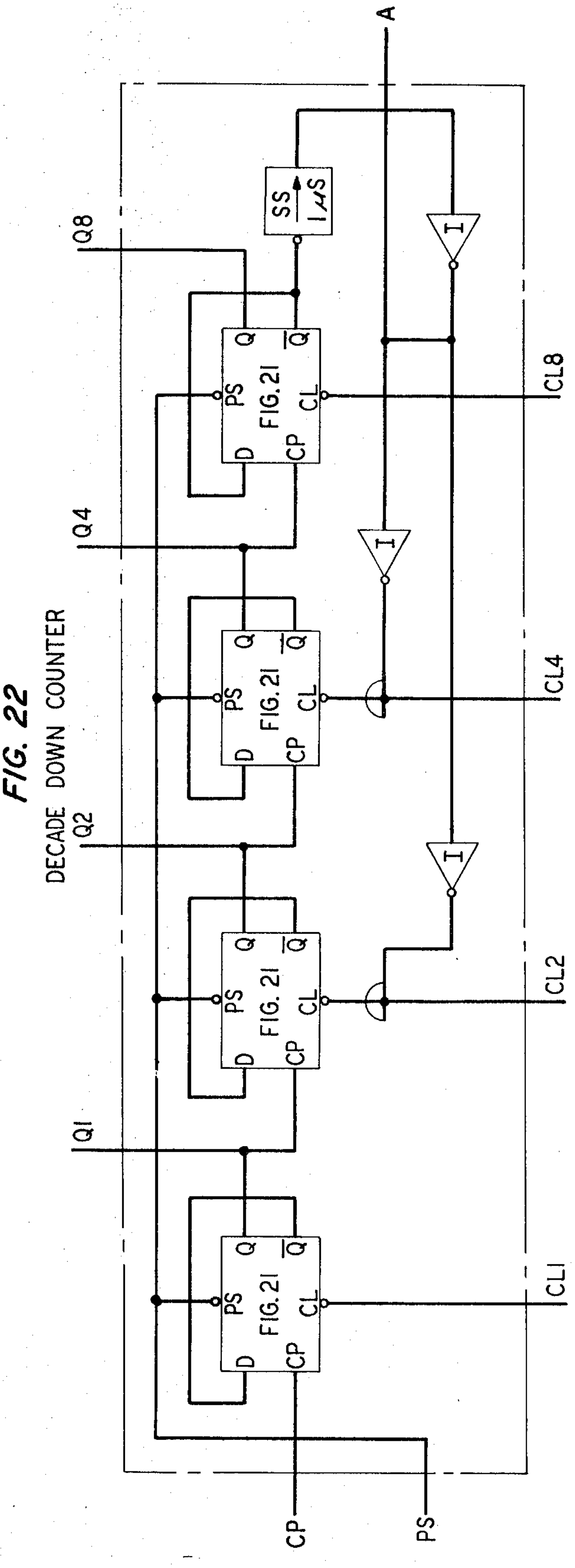
Figure 23:
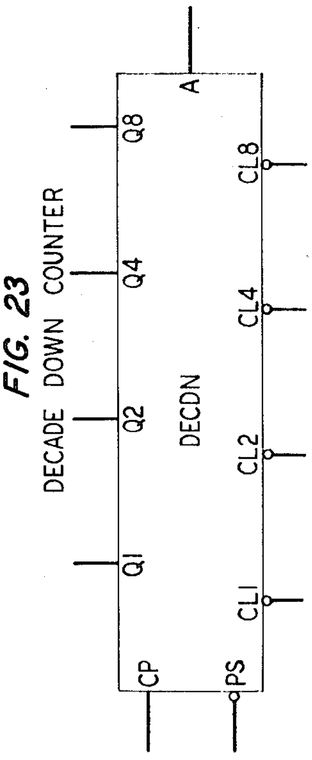

FIG. 22 shows how flip-flop like FIG. 21 may be arranged as a decade down counter, the (1for which is shown the FIG. 23. The CL1, CL2, CL4, 15CL8 inputs are normally high. The (2) lead PS is normally high: making the PS lead low (3) preset all flip-flops (cells) to Q high and $\overline{Q}$ (4) The A output is normally low: the A output will carry a low-to-high pulse whenever the Q8 stage changes to Q high and $\overline{Q}$ low. The clock pulse lead CP is effective to control the flip-flops only when the CP lead is pulsed low-to-high.

With the leads CL1, CL2, CL4, and CL8 high, whenever PS goes from high-to-low all stages are preset to Q high and $\overline{Q}$ low (a count of fifteen or 1111 in binary code). With PS high, any lead CL1, CL2, CL4 or CL8 going low will clear the corresponding stage to Q low and $\overline{Q}$ high. The CL— leads are used to set the down counter to a certain decimal value such as nine (1101, using decimal weighings of 1, 2, 4 and 8 for Q1, Q2, Q4 and Q8).

With a value set in the down counter, such as nine with Q1 high, Q2 low, Q4 low and Q8 high (1101), with input PS high, and with all CL— inputs high, positive (low-to-high) pulses on input CP will cause the down counter to down count to zero (0000). The next clock pulse will set all stages to fifteen (1111); but, the single-shot circuit connected to the $\overline{Q}$ output lead of stage Q8 will provide a 1 $\mu$s negative (high-to-low) pulse to clear stages Q2 and Q4 so as to make Q2 low and Q4 low. This changes the down counter to a value of nine (1001), the initial starting point. The down counter thus functions as a decimal down counter which goes from zero (0000) to nine (1001) instead of from zero (0000) to fifteen (1111); and, each time the counter goes from a count of zero (0000) to a count of nine (1001), the A output provides a short high pulse.

8421 BCD COUNTER

Figure 24:
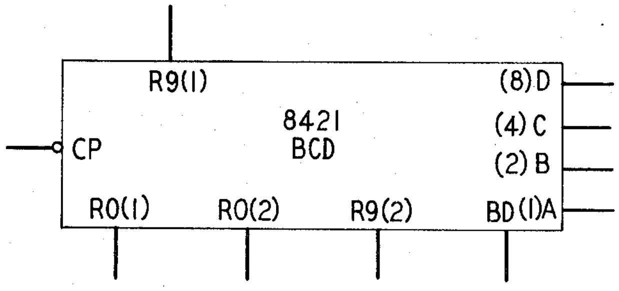

FIG. 24 shows the symbol of a typical decade counter such as Texas Instruments integrated circuit SN7490 and the like. The binary coded decimal weighings of the output leads A, B, C and D are 1, 2, 4 and 8 respectively. Used as a symmetrical divide-by-10 counter, the D output is connected to the CP input, BD is the input, and A is the output. Used as a binary coded decimal counter, BD is connected to A, and CP is the input.

As a BCD counter, if RO(1) and RO(2) are high and at least one of R9(1) and R9(2) is low, the counter is forced into and is held in state zero (0000). If R9(1) and R9(2) are high, the counter is set and is held in state nine (1001). If RO(1) or RO(2) or both are low and R9(1) or R9(2) or both are low, the following table shows the states of the A, B, c and D outputs as the clock pulse input CP (P) receives high-to-low pulses:

| | 1 | 2 | 4 | 8 | |
|---|---|---|---|---|---|
| CP | A | B | C | D | Decimal count |
| P | L | L | L | L | 0 |
| P | H | L | L | L | 1 |
| P | L | H | L | L | 2 |
| P | H | H | L | L | 3 |
| P | L | L | H | L | 4 |
| P | H | L | H | L | 5 |
| P | L | H | H | L | 6 |
| P | H | H | H | L | 7 |
| P | L | L | L | H | 8 |
| P | H | L | L | H | 9 |
| P | L | L | L | L | 0 |
| | | etc. | | | |

DECADE UP COUNTER

Figure 25:
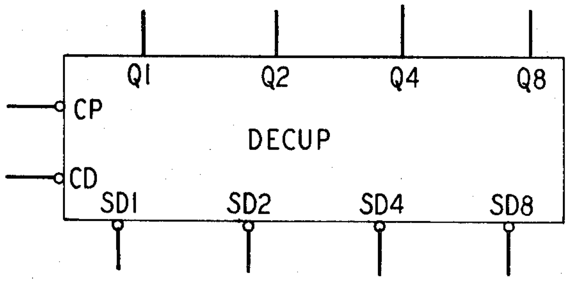

FIG. 25 shows a typical binary-coded decimal counter such as Motorola integrated circuit MC838 and the like. With all SD— inputs high and with input CD low, the counter goes to state zero (0000) with Q1, Q2, Q4 and Q8 each low. With the CD input high, any of the SD— inputs being pulsed high-to-low will set the corresponding stage (or cell) into state "1"with the corresponding Q1, Q2, Q4 or Q8 high. With input CD high and all SD— inputs high, the internal circuitry is arranged so that the counter will progress through 10 decimal counts and repeat as long as the clock pulse lead CP is pulsed (P) negatively (high-to-low). The following table shows the action of the counter:

| | | | 1 | 2 | 4 | 8 | |
|---|---|---|---|---|---|---|---|
| CD | SD | CP | Q1 | Q2 | Q4 | Q8 | Decimal count |
| H | H | P | L | L | L | L | 0 |
| H | H | P | H | L | L | L | 1 |
| H | H | P | L | H | L | L | 2 |
| H | H | P | H | H | L | L | 3 |
| H | H | P | L | L | H | L | 4 |
| H | H | P | H | L | H | L | 5 |
| H | H | P | L | H | H | L | 6 |
| H | H | P | H | H | H | L | 7 |
| H | H | P | L | L | L | H | 8 |
| H | H | P | H | L | L | H | 9 |
| H | H | P | L | L | L | L | 0 (10) |
| H | H | P | H | L | L | L | 1 |
| | | | | etc. | | | |

SIGNALS

Figure 26:
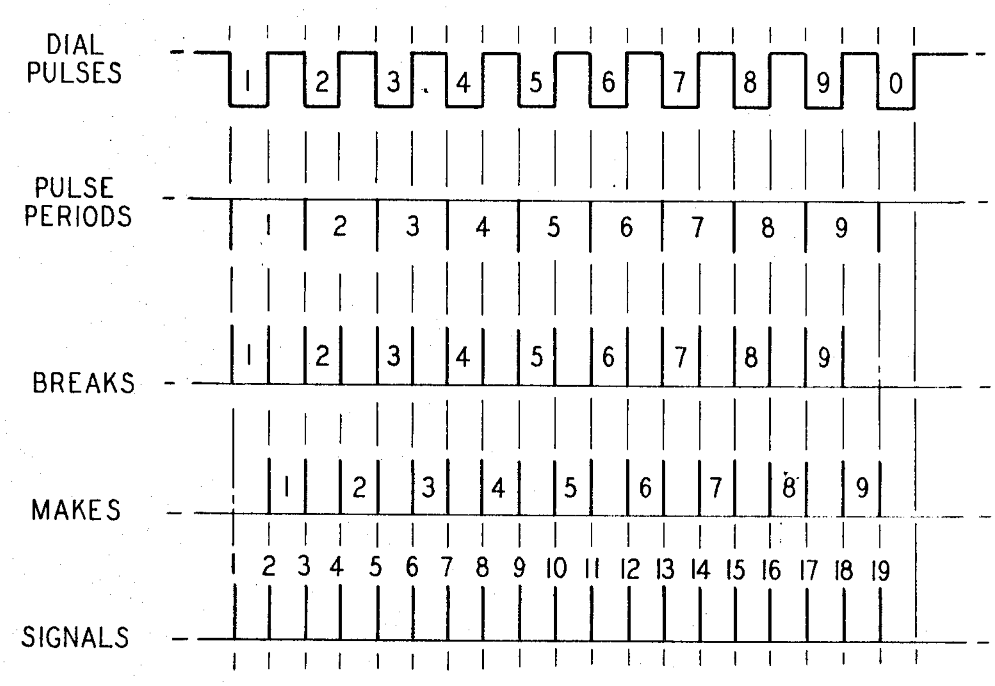

Since the exemplary disclosure is part of a test set for measuring various aspects of telephone dial pulses, FIG. 26 is provided to explain the type of pulsing involved and the significant signals which can be derived from such pulsing.

The top line in FIG. 26 shows a series of 10 break intervals and the nine intervening make intervals making up nine full pulse periods. Nominally, telephone dials will pulse at the rate of about 10 pulses (pulse periods) per second with about a 50–60 percent break and a corresponding 50–40 percent make (percentage of total pulse period). Of course, the pulsing speed and percentages can vary quite widely, as is well known. In FIG. 26, the top line designates the 10 break intervals, the second line designates the nine full pulse periods, the third line designates the nine break intervals of the first nine pulse periods, and the fourth line designates the nine make intervals of the first nine pulse periods. The fifth line shows the 19 signals (transitions) definitive of the parts of the first nine pulse periods.

In measuring dial pulses, or any other similar time interval phenomenon, it will be appreciated that any of the makes, breaks, pulse periods, or pulse transitions can be arranged by suitable well-known circuitry to be of any desired polarity depending upon the requirements of the circuit controlled thereby. For example, in the detailed circuitry to be described hereinafter, it has been convenient to discuss responses to positive or high signals even though the particular time intervals of interest, such as the break intervals of FIG. 26, may sometimes be thought of in the opposite sense. Likewise, the make intervals will be considered as negative or low even though they may generally be considered in the reverse sense.

It is desirable when using clock-controlled measuring circuitry, as in the exemplary disclosure, to arrange the dial input circuit so that the input dial pulses are synchronized with the clock. This will insure that switching and logic functions are performed with the minimum amount of error. Such an arrangement for clock synchronization of otherwise random input pulses is disclosed and claimed in an application of R. B. Heick, Ser. No. 849,997, filed on Aug. 14, 1969, allowed on Dec. 16, 1970 and entitled "Delayed Clock Pulse Synchronizing of Random Input Pulses". However, as mentioned hereinafter, the present circuit can measure input signals not synchronized with the clock pulses and can do so with negligible error.

BLOCK DIAGRAM

Figure 1:
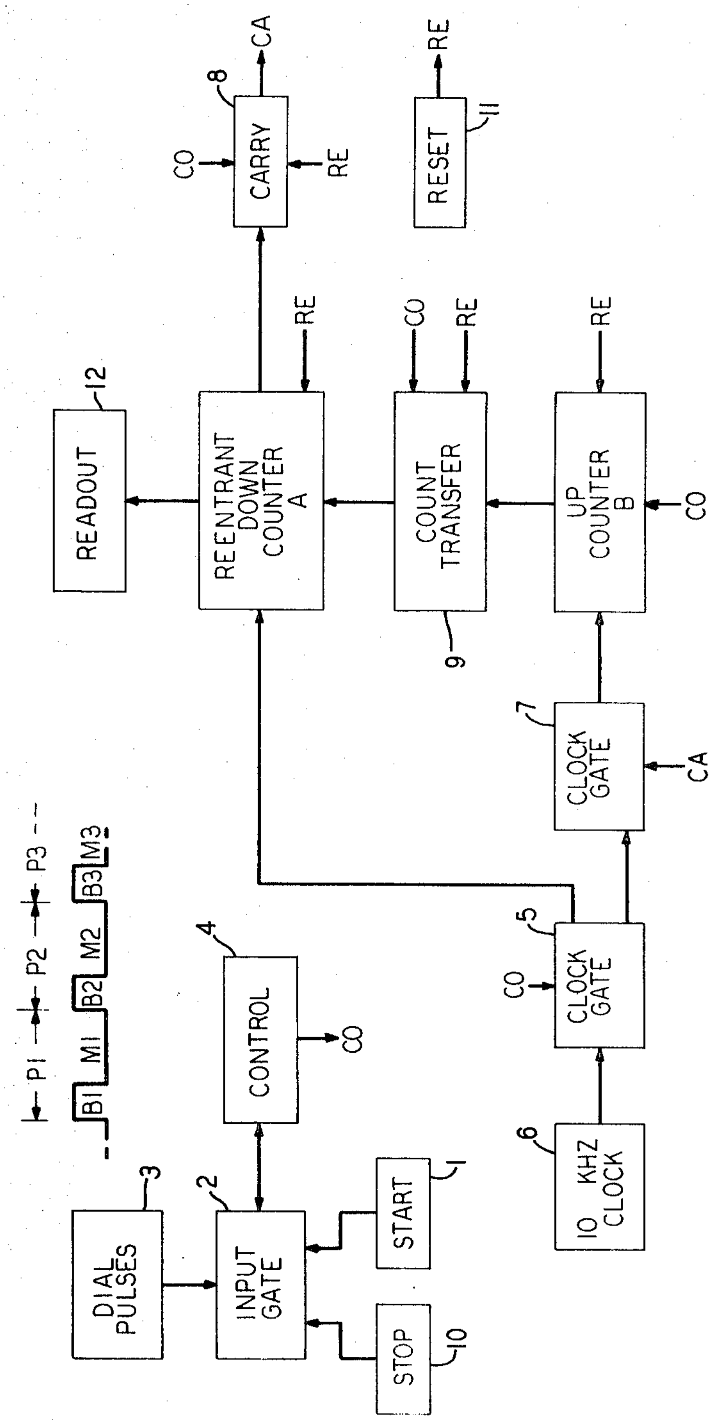
FIG. 1 is a block diagram of the detailed circuit embodiment shown in FIGS. 27 and 28 arranged as shown in FIG. 29 (same sheet as FIG. 1)

The block diagram of FIG. 1 shows the main functional parts of the detailed circuit of FIGS. 27 and 28. Two full pulse periods P1 and P2 and part of a third pulse period P3 are shown, each divided into break (B1, B2 and B3) intervals and make (M1, M2 and M3) intervals. The breaks have been shown as positive or high since the circuitry is arranged to be responsive to high signals (or low-to-high transitions) for measurement purposes and since it has been assumed that minimum break is to be measured.

The system is cleared (such as by operating the reset 11) for use by setting up-counter B and down-counter A each to maximum count, counters A and B having the same count capacity: also, the carry 8 is set to provide a carry signal on lead CA. When the start circuit 1 is energized, the input gate 2 is enabled to be controlled by the input dial pulses 3. As the dial pulses arrive at the input gate 2, signals will pass from the input gate 2 to the control 4 so that the control 4 knows when break intervals B1, B2, B3, etc. begin and end.

At the start lead the first break B1, the control 4, over control lead CO, clears counter B to zero count, enables clock gate 5 to pass clock pips from the 10 kHz. clock source 6 to down-counter A and to clock gate 7. Since down-counter A was preset to maximum count, the clock pips will cause the A count to down-count from maximum count toward zero count. The carry signal on lead CA has enabled clock gate 7 to pass clock pips to cause counter B to up-count from zero. The carry 8 remains as set throughout the first break B1 such that clock pips are fed to counters A and B during the entire break B1.

At the end of the first break B1 (i.e., the start of the first make M1), the control 4, over control lead CO, disables clock gate 5 to prevent passage of any further clock pips through clock gates 5 and 7. Also, at the end of break B1, the control 4, over control lead CO, resets the carry 8 (to provide a carry signal on lead CA) and enables the count transfer 9. When the count transfer 9 is enabled, the count in B is transferred to A as a new starting count in A.

At this point in time, counter B contains a clock pip count indicative of the time interval or duration of the first break B1; and, counter A contains the same clock pip count as in B.

At the start of the second break B2 (on the end of the first make M1), the control 4 over lead CO will have disabled the count transfer 9 and clears counter B to zero count. Clock gate 7 is enabled since the carry signal is still present on lead CA by the resetting of the carry 8. Clock pips from the clock 6 are passed by clock gate 5 into counter A where they are serially subtracted (down-counted) from the count in A. Clock pips are also passed by clock gates 5 and 7 into counter B where they are up-counted from zero count, Since counter A contains a count which is the same as the previous count in B, the number of clock pips required to cause counter A to arrive at zero count is the same as the count previously existing in counter B.

If the second break B2 is equal to or of less duration than the first break B1, counter A will not reduce its count below zero. In such a case, the end of the second break B2 (start of the second make M2) will cause the control 4 to disable clock gate 5 and to transfer to counter A (as a new count) the new (and shorter or minimum) count accumulated in counter B.

If the second break B2 is greater than (longer—of more duration) the first break B1, counter A will be driven to zero count, then to capacity count, and then to another dissipative clock pip count until the end of break B2. When counter A goes from zero count to capacity count, the carry 8 is set to remove the carry signal from lead CA. The removal of the carry signal from lead CA thereupon disables clock gate 7 to prevent the addition of further clock pips serially to the new count in B. The result is that at the end of break B2, counter B will contain a clock pip count representative of the then minimum break interval B2.

At the end of the second break B2, the control 4 again transfers the B count into A, disables clock gate 5, and resets the carry 8.

At the beginning of the third break B3, the control 4 again clears counter B to zero count, etc.

The above process is repeated for each break interval B3, etc. until the circuit action is stopped, either manually or automatically. The circuit can be stopped manually at any time by manipulation of the stop circuit 10, whereupon the input gate 2 is disabled and the control 4 prevents any further action of the circuitry. Although not shown in FIG. 1, means is provided whereby the control 4 may cause an automatic stop after having processed a prescribed number of time interval measurements.

The readout 12 is a combined decoder and lamp display device whereby the count existing in counter A after transfer (i.e., the then minimum break count) is decoded from the binary form in counter A into decimal form for lighting the display to show the minimum break in milliseconds.

The circuitry is arranged, as will be obvious, to measure makes or pulse periods if desired, in addition to breaks. All that is necessary is for the input circuit to arrange and feed to the input gate 2 the appropriate ones of the signals shown in FIG. 26.

DETAILED CIRCUIT DISCLOSURE

Figure 29:
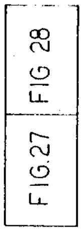

With reference to the detailed circuit disclosure of FIGS. 27 and 28 (see FIG. 29 on the same sheet as FIG. 1), certain switches, contacts and controls may warrant brief comment. In FIGS. 27 and 28 are shown switch arms designated RS1 and RS2: these represent ganged switch arms on a Range Switch, the arms operable into one position (–99.9 ms) or the other (0–999 ms) for making respective measurements of a time interval of less than 100 milliseconds (ms) or more than 99.9 ms. In FIG. 27, when measuring an interval of less than 100 ms duration, the output of inverter 118 is connected to lead 272 at the input to single-shot SS4; whereas, when measuring an interval of more than 99.9 ms duration, the C output of counter CN2 is connected to lead 272, etc. In FIG. 28, when measuring an interval of less than 100 ms, the decimal point lamp DECPT is lit by being connected to the +190 volt source; whereas, when measuring an interval of more than 99.9 ms, the decimal point lamp DECPT is extinguished since it is connected to ground on both sides. In FIGS. 27 and 28 are shown contacts F4–1 through F4–8: these contacts are closed when the F4 switch is operated to adjust the circuit for measuring minimum break intervals. In FIG. 27 is shown a switch S (upper left) with its movable arm shown in contact with a back contact 1 and movable into contact with a make contact 2. Switch S represents a locking-pushbutton switch which, when in one position, will remain there until the button is pushed, whereupon the switch goes to the other position and remains there until the button is pushed again, etc. When the movable arm of switch S is moved upward, the back contact 2 opens before the make contact 1 closes; and, when the arm of switch S is moved downward (to the position shown), make contact 1 opens before back contact 2 closes. In the upper part of FIG. 27 are shown five rotary switches BCD0, BCD8, BCD4, BCD2 and BCD1: these switches are ganged to rotate in synchronism. In the position shown, the upper input to gate G5 is connected over contact F4–3 and lead 270 to ground at the "0" contact of switch BCD0: in this position of the BCD–switches, the circuit is adjusted for continuous operation. When the BCD–switches are set in any other position (1 to 9), the circuit is adjusted to stop automatically after measuring the corresponding number of time intervals.

STARTING CONDITIONS

The following test conditions are assumed:

(1) switch F4 is operated to enable minimum break measurements;

(2) the Range Switch is operated so that arms RS1 and RS2 are in the 0–99.9 ms positions since the intervals to be measured are assumed to be less than 100 ms;

(3) the BCD–switches of FIG. 27 are in the position shown for enabling continuous operation; and, (4) the DIAL PULSE INPUT box in FIG. 27 provides a series of telephone dial pulses, such as in FIG. 26, with the breaks high and the makes low.

With the Range Switch in the 0–99.9 ms position, the decimal point lamp DECPT in FIG. 28 is lit in an obvious circuit through resistance R5 to the +190 volt direct current source: also, in FIG. 27, the C output of counter CN2 is disconnected from the circuit, with the output of 118 connected to lead 272 and to the input to SS4. The decoder and readout circuits NX1, NX2 and NX3 of FIG. 28 represent binary-to-decimal translators for converting the binary count in counters CN6, CN7 and CN8 to equivalent decimal values to light lamps (0 to 9). When the decimal point lamp DECPT is lit and physically located between NX1 and NX2, and when the lamp display is read in the order of NX3 to NX2 to NX1, then NX3 shows the tens of milliseconds, NX2 shows the units of milliseconds, and NX1 shows the tenths of milliseconds. If the Range Switch were in the position 0–999 ms, then the lamp DECPT would be extinguished to permit NX3, NX2 and NX1 to show respective hundreds, tens and units of milliseconds as registered in respective counters CN8, CN7 and CN6.

CLEARING THE CIRCUIT

The circuit is cleared (initialized, normalized) by the operation in FIG. 27 of the switch S to its upper position (the Clear/Start position). This operation of switch S results in the following circuit functions:

(1) the input flip-flop FF1 in FIG. 27 is cleared to its zero state (Q low-$\overline{Q}$ high);

(2) the lower register (counters CN3, CN4 and CN5) in FIG. 28 is set to a count of 999 (all outputs Q1 and Q8 high and all outputs Q2 and Q4 low);

(3) the upper register (counters CN6, CN7 and CN8) in FIG. 28 is set to a count of 999 (all outputs Q1 and Q8 high and all outputs Q2 and Q4 low);

(4) the carry flip-flop FF2 in FIG. 28 is set to its one state (Q high); and, (5) the counters CN1 and CN2 in FIG. 27 are not involved since the BCD–switches are set on their "0" terminals and the Range Switch RS1 is in contact with its "0–999.9 ms" contact.

With the switch S in FIG. 27 in its lower (Stop/Read mode) position as shown, the input to I1 is low to ground over the back contact 2 of switch S, thus making the output of I1 high at the lower input to gate G1: since the upper input to G1 is high through resistance R1, the output of G1 will be low corresponding to the low input to I1 from switch S. G1 and I1 comprise, in effect, a flip-flop circuit which disregards chatter at contact 2 since any variation at contact 2 cannot affect the output of I1 provided contact 1 remains high. With the output of I1 high, the output of I2 will be low to hold low the output of collector tie CT1 at the input to I5. The output of I5 is high at the lower input to G4 and the upper input to G4 is held high through resistance R9 from single-shot SS1: thus, the output of G4 is low, thus to enable FF1 to be cleared (Q low-$\overline{Q}$ high) responsive to a high-to-low transition at its CP input.

When switch S is operated (button pushed once from the position shown) so that the swinger opens contact 2 and closes contact 1, the low upper input to G1 forces the output of G1 to go high to correspond to the high input to I1 through resistance R2, thus making the output of I1 on lead 277 low. Lead 277 thus carries a high-to-low transition, which causes single-shot SS1 to produce at its output a 25 μs low pulse through resistance R9 onto lead 278. The low on lead 277 becomes a high at the output of I2 at the left input to collector tie CT1: the middle input to CT1 is also high from the output of I3, whose input on lead 279 is held low from I9, the input to which is held high from the output of G5, whose upper input is held high from the output of G5, whose upper input is held low through contact F4–3 to ground on lead 270 over the wiper of switch arm BCD0. The 25 μs low from SS1 causes the output of G4 to go high for 25 μs at the D input to FF1 (through contact F4–1) and to the right input to collector tie CT1. The output from collector tie CT1 is thus high for at least 25 μs at the input to I5, to produce a 25 μs low at the output of I5 and at the lower input to G4. The 25 μs low on lead 278 produces a 25 μs high at the output of G2 whose upper two inputs are permanently high. The 25 μs high from G2 extends through I4 as a 25 μs low at the right input to collector tie CT3, which provides a 25 μs low at the output (its left input is held high from 16) at the CL input to FF1. With the PS input to FF1 permanently high, a low on the CL input clears FF1 to its zero state (Q low-$\overline{Q}$ high).

The 25 μs high from G2 causes the output of G3 (upper inputs permanently high) to go low for 25 μs on the direct clear lead 271 in FIGS. 27 and 28 (lead 271 is normally high). The 25 μs low on lead 271 in FIGS. 27 and 28 sets the upper and lower registers to counts of 999, sets the carry flip-flop FF2 of FIG. 28 (Q high), and enables the input flip-flop FF1 of FIG. 27 to be controlled by the leading edge (low-to-high) of the first high dial pulse input break interval.

The 25 μs low clearing pulse on lead 271 in FIGS. 27 and 28 produces the following control pulses:

(1) inverter I20 in FIG. 27 provides a 5 μs low pulse on lead 273 to establish the first 5 μs period of the 25 μs clearing interval during which (a) the upper register of FIG. 28 is set to maximum capacity (count of 15 in each counter—all cells set to their one state—all outputs Q1, Q2, Q3 and Q8 high), (b) the lower register of FIG. 28 is set to a count of nine in each counter (outputs Q1 and Q8 high-outputs Q2 and Q4 low) and (c) the carry flip-flop FF2 of FIG. 28 is prevented from changing state; and, (2) gate G16 of FIG. 28 produces a 2 μs high pulse on lead 282 to transfer the 999 count of the lower register into the upper register and to set the carry flip-flop FF2 of FIG. 28 (Q high).

Prior to the occurrence on lead 271 in FIG. 27 of the 25 μs low clearing pulse from G3, the output of G10 is low (since its middle input is held high from SS3 and its lower input is held high from SS5) and the output from G8 is low on lead 275 (since its middle input is held high from REG and its lower input is held high on lead 271): thus, the output of I20 onto lead 273 is also held high. In FIG. 28, the low on lead 275 is effective at the output of DEL4 as a low at the left input to G14 to hold the output of G14 high. The high on lead 273 in FIG. 28 holds the right input to G14 high, holds the K input to FF2 high through G30 and I36, and holds the output of G15 on lead 281 high through I21 and DEL5. The normally high output of SS6 in FIG. 28 is effective to hold the output of G16 low on lead 282, which is effective through I35 to hold high the SD input to FF2. The low on the transfer lead 282 holds high the outputs of all of the transfer gates G18 through G29 at the CL1, CL2, CL4 and CL8 inputs to the counters CN6, CN7 and CN8 of the upper register. In FIG. 27, the normal high output of SS8 is effective through I38 to hold the output of G34 high on lead 285, which extends to the lower input in FIG. 28 of G32. The output of G32 is held low since its upper input is held high through I37 and G31, whose left input is held high from SS7. The low output of G32 is effective through G33 to hold high the output of G33 on lead 283 at the CD inputs of counters CN3, CN4 and CN5. In FIG. 28, the normally low output of G31 is effective through I40, DEL6, I41 and I42 to hold high the output of I42, which extends to the SD8 input to CN3 and to the SD1 and SD1 and SD8 inputs to CN4. The high output from I42 is effective through G35 and I43 to hold high the SD1 and SD8 inputs to CN5 and is effective through G36 and I44 to hold high the SD1 input to CN3. In FIG. 27, the normal high output from SS4 is effective through I19 and G13 to hold high lead 274 into FIG. 28 and through contact F4–7 to the CP input to counter CN3. Also, in FIG. 27, the low Q output of the cleared input flip-flop FF1 is effective at the next-to-lower input to G12 to hold high the output of G12, which is effective through I18 and switch RS1 to hold lead 272 low into FIG. 28 and through contact F4–8 at the CP input to counter CN6.

The 25 μs low clearing pulse on lead 271 in FIG. 27 causes SS5 to produce a 5 μs low output pulse, which is effective through G10 and I20 to produce on lead 273 into FIG. 28 a 5 μs low pulse. The 5 μs low pulse on lead 273 in FIG. 28 holds high the output of G14 for at least 5 μs. The 25 μs low pulse on lead 271 in FIG. 27 causes G8 to produce a 25 μs high output pulse on lead 275 into FIG. 28, which is effective through DEL4 to hold the left input to G14 low for the first 0.3 μs of the 25 μs interval and then to allow the left input to G14 to go high for the remainder of the 25 μs. In FIG. 28, the 5 μs low on lead 273 extends to the upper input to G30 where it is effective through G30 and I36 to hold the K input to FF2 low for at least 5 μs, during which interval FF2 cannot change state since both of its J and K inputs are low. In FIG. 28, the 25 μs low on lead 271 causes SS7 to produce a 2 μs low pulse at the left input to G31, which produces a 2 μs high output pulse from G31. The 2 μs high from G31 is effective through I37, G32 and G33 to produce a 2 μs low at the CD inputs to counters CN3, CN4 and CN5. Also, the 2 μs high output from G31 in FIG. 28 is effective at once through I40, DEL6, I41 and I42 to produce at the output of I42 a 2,3 μs low pulse (the low-to-high trailing edge of the 2 μs low input to DEL6 is delayed for 0.3 μs). The 2.3 μs low output from I42 is applied to the SD8 input to CN3 and to the SD1 and SD8 inputs to CN4, is applied through G36 and I44 as a 2.3 μs low at the SD1 input to CN3, and is applied through G35 and I43 as a 2.3 μs low at the SD1 and SD8 inputs to CN5. In FIG. 28, the 5 μs low on lead 273 produces a 5 μs high at the output of I21: the leading edge of the 5 μs high is delayed 0.6 μs in DEL5, which then causes the output of G15 to go low on lead 281 for the remaining 4.4 μs of the 5 μs interval.

In FIG. 28, with respect to counters CN3, CN4 and CN5 of the lower register, the CD inputs are pulsed low for 2 μs and the SD1 and SD8 inputs are pulsed low for the same 2 μs plus 0.3 μs. With inputs SD2 and SD4 high, the high-to-low 2 μs pulse on the CD inputs will clear cells 2 and 4 to their zero states (Q2 and Q3 outputs low). When the 2 μs low on the CD inputs expires, the 2.3 μs low on the SD1 and SD8 inputs still prevails for 0.3 μs as the CD inputs return to high: this will set the cells 1 and 8 to their one states (Q1 and Q8 high). At the end of the 2.3 μs interval, each of the counters CN3, CN4 and CN5 will be set to a count of 9 (Q1 and Q8 high-Q2 and Q4 low). Also, at the end of the 2.3 μs interval, all SD-inputs to counters CN3, CN4 and CN5 will return to high, with all CD inputs high and all CP inputs high, leaving the count of 999 in the lower register and enabling counters CN3, CN4 and CN5 so that they can count high-to-low transitions at their CP inputs (the CP input to counter CN4 is held high through G17 and I22 from the high Q8 output of CN3 and the CP input to counter CN5 is held high from the high Q8 output of CN4).

In the meantime, after the 0.6 μs delay in DEL5 in FIG. 28, the 4.4 μs low pulse on lead 281 is effective at the PS inputs to counters CN6, CN7 and CN8 to preset every cell to its one state (all Q1, Q2, Q4 and Q8 outputs high) since all of the CL1, CL2, CL4 and CL8 inputs are held high from the transfer gates G18 through B29. The CP input to CN6 is held low through contact F4–8 to the low on lead 272; the CP input to CN7 is held high from the high Q8 output of CN6; the CP input to CN8 is held high from the high Q8 output of CN7; and, the A output from CN8 is held normally low on lead 284 at the CP input to FF2.

At the end of the 5 μs interval produced in FIG. 27 by single-shot SS5, the outputs from I20 on lead 273 is returned to a steady high in FIG. 28 at the input to I21 and at the right input to G14. The output of G15 at once returns to a steady high on lead 281 at the PS inputs to counters CN6, CN7 and CN8. The high on lead 273 is also effective in FIG. 28 through G30 and I36 to return to K input of FF2 to a steady high, thus to enable FF2 to be controlled by its CP input (J input is low and K input is high).

The output of G14 in FIG. 28, in going low at the end of the 5 μs interval, will be held low until the end of the 25 μs clearing interval from the output of DEL4. The high-to-low transition of the output of G14 causes SS6 to produce a 2 μs low pulse at the lower input to G16 and a 2 μs high output from G16 on the transfer lead 282. The 2 μs high pulse on lead 282 extends through I35 as a 2 μs low pulse at the SD input to FF2, which thereupon is set with its Q output high. The high Q output of FF2 extends over lead 276 into FIG. 27 to the lower input to G13 to render G13 responsive to low-to-high transitions (to be described) at its upper input.

The 2 μs high pulse from G16 on the transfer lead 282 in FIG. 28 causes the transfer from the lower register into the upper register of the count of 999 presently preset into the lower register. The 2 μs high pulse on lead 282 at the left inputs to the transfer gates G18 through G29 will allow the output from any such gate to go low for 2 μs only if the corresponding output from the counters CN3, CN4 and CN5 is low-otherwise, the output of the transfer gate will remain high. Taking counter CN3, for instance, it will be recalled that counter CN3 was preset to a count of nine (Q1 and Q8 high-Q2 and Q4 low), thus through I23, I24, I25 and I26 to make the right inputs high to gates G19 and G20 and low to gates G18 and G21. The transfer gates G19 and G20 will provide 2 μs low pulses at inputs CL2 and CL4 of counter CN6; and, the outputs of transfer gates G18 and G21 will remain high at the CL1 and CL8 inputs to counter CN6. With the PS input to counter CN6 high and with all cells of CN6 set to their one states (Q1, Q2, Q4 and Q8 outputs high), a low pulse on any CL-input will clear the corresponding cell to its zero state (Q low). Thus, the 2 μs low on the CL2 and CL4 inputs to counter will clear the two middle cells to their zero states, the highs on the CL1 and CL8 inputs will allow the first and last cells to stay in their one states; and, the result is to change the setting of counter CN6 to a count of nine (Q1 and Q8 high-Q2 and Q4 low) to correspond to the nine presently registered in counter CN3. Similarly, counters CN7 and CN8 are changed from a setting of fifteen (Q1, Q2, Q4 and Q8 high) to a setting of nine (Q1 and Q8 high-Q2 and Q4 low) to correspond to the counts of nine in the respective counters CN4 and CN5.

At the end of the 2 μs transfer interval (the 2 μs high from G16 in lead 282 in FIG. 28), all of the circuits will have reverted to their steady conditions except the following:

(1) the 25 μs low still on lead 271 in FIG. 27 will hold the output of G8 high on lead 275 into FIG. 28 where DEL4 holds the left input to G14 high to, in turn, hold the output of G14 low;

(2) the 25 μs low in FIG. 27 from the output of I4 holds the output of collector tie CT3 low at the CL input to FF1; and, (3) the 25 μs low on lead 278 in FIG. 27 holds the output of G4 high at the D input to FF1.

At the end of the 25 μs low clearing pulse from single-shot SS1 in FIG. 27, lead 278 returns to a high state. The output of G4 stays high at the D input to FF1 since the output of collector tie CT1 stays high at the input to I5, whose low output at the lower input to G4 keeps the output of G4 high, etc. The output in FIG. 27 of G2 returns to low at the end of the 25 μs clearing pulse to, in turn, cause the output of I4 to return to high and the output of G3 to return to high on lead 271. The high from I4 is effective through collector tie CT3 to make the CL input to FF1 high, In FIG. 27, the high on lead 271 returns the output of G8 to low on lead 275 into FIG. 28 where DEL4 at once returns the left input to G14 to low and the output of G14 to high.

The status of the circuit at the end of the 25 μs clearing pulse is as follows:

(1) the upper register (counters CN6, CN7 and CN8) of FIG. 28 is set to a count of 999;

(2) the lower register (counters CN3, CN4 and CN5) of FIG. 28 is set to a count of 999;

(3) the carry flip-flop FF2 in FIG. 28 is set to its one state (Q high); and, (4) the input flip-flop FF1 in FIG. 27 is cleared to its zero state (Q loq-$\bar{Q}$ high).

The circuit is now cleared (normalized or initialized) to be ready to process the first high break interval from the DIAL PULSE INPUT of FIG. 27.

SUMMARY OF CIRCUIT CLEARING

From the above description of the circuit clearing operation, the parts of the circuit are ready to accept dial pulse input information from the DIAL PULSE INPUT in FIG. 27.

In FIG. 27, the input flip-flop FF1 is cleared (Q low-$\overline{Q}$ high) with its PS input permanently high, its CL input high from collector tie CT3, its D input high from G4, and its CP input connected through contacts F4–2 and F4–4 to the output of the DIAL PULSE INPUT. In this condition, the input flip-flop FF1 is able to respond to a low-to-high transition at its CP input to make its Q output the same (high) as its D input.

In FIG. 28, the carry flip-flop FF2 is set in its one state (Q high) with its J input permanently low, its K input high from I36, its SD input high from I35, and its CP input low on lead 284 from the low A output of counter CN8. In this condition, the carry flip-flop FF2 is able to respond to a high-to-low transition at its CP input to clear itself (Q goes from high to low).

In the lower register of FIG. 28, each counter CN3, CN4 and CN5 is set to a count of nine (Q1 and Q8 outputs high-Q2 and Q4 outputs low) with its SD2 and SD4 inputs permanently high, with input SD1 of CN3 high from I44, with input SD8 of CN3 high from I42, with inputs SD1 and SD8 of CN4 high from I42, with inputs SD1 and SD8 of CN5 high from I43, with its CD input high on lead 283 from G33, with the CP input to CN3 high through contact F4–7 and over lead 274 into FIG. 27 from G13, with the CP input to CN4 high from G17, and with the CP input to CN5 high from the high Q8 output of CN4. In this condition, counters CN3, CN4 and CN5 are able to up-count in response to high-to-low transitions at their CP inputs. As will be seen later (at the first low-to-high transition of the first low-make-to-high-break transition from the DIAL PULSE INPUT in FIG. 27), the lower register of FIG. 28 will be cleared such that each of the counters CN3, CN4 and CN5 will be at zero count at the start of the processing of the first high break interval.

In the upper register of FIG. 28, each counter CN6, CN7 and CN8 is set to a count of nine (Q1 and Q8 high-Q2 and Q4 low) with its CL–inputs high from the transfer gates G18 through G29, with its PS input high on lead 281 from G15, with the CP input of CN6 low through contact F4–8 and over lead 272 into FIG. 27 and over switch RS1 from I18, with the CP input to CN7 high from the high Q8 output of CN6, and with the CP input to CN8 high from the high Q8 output of CN7. In this condition, counters CN6, CN7 and CN8 are able to down-count in response to low-to-high transitions at their CP inputs.

With regard to the lower register, when counter CN3 up-counts from 9 to 0 to 1 to 2, etc., each change from 9 to 0 causes the Q8 output to go from high to low. The high-to-low Q8 transition from CN3 provides, through I22 and G17, a high-to-low transition at the CP input to CN4. Thus, CN4 up-counts one count count for each 10 up-counts in CN3. Likewise, counter CN5 will up-count one count for each 10 up-counts in CN4. Under control of the 10 kHz. clock, the counts in counters CN5, CN4 and CN3 will indicate respective tens, units and tenths of milliseconds.

With regard to the upper register, when counter CN6 down-counts from 3 to 2 to 1 to 0 to 9 to 8, etc., each change from 0 to 9 causes the Q8 output to go from low to high. The low-to-high Q8 transition from CN6 is effective at the CP input to CN7 to cause CN7 to down-count one count. Likewise, the low-to-high Q8 transition from CN7 (when it down-counts from 0 to 9) causes counter CN8 to down-count one count. Also, each time CN8 down-counts from 0 to 9, its A output carries a short high pulse on lead 284 at the CP input to the carry flip-flop FF2. Under the control of the 10 kHz. clock, the counts in counters CN8, CN7 and CN6 will indicate respective tens, units and tenths of milliseconds.

LEADING EDGE OF FIRST HIGH BREAK

At the leading edge (low-to-high) of the first break interval from the DIAL PULSE INPUT of FIG. 27, after the conclusion of the above-discussed clearing operation, the following circuit functions are performed:

(1) the input flip-flop FF1 of FIG. 27 is set to its one state (Q high–$\overline{Q}$ low) to allow processing of the first high break interval;

(2) the lower register (counters CN3, CN4 and CN5) of FIG. 28 is cleared to zero count;

(3) the upper register (counters CN6, CN7 and CN8) of FIG. 28 is arranged to down-count (from its starting count of 999) one count at the leading edge (low-to-high) each high clock pulse; and, (4) the lower register of FIG. 28 is arranged to up-count (from its cleared condition of zero count) one count at the trailing edge (high-to-low) of each high clock pulse.

When the DIAL PULSE INPUT of FIG. 27 produces the leading edge (low-to-high) of the first high input break interval, the upper input to G6 is made high through contact F4–4. This high extends also over contact F4–2 to the CP input to FF1, which thereupon becomes set (Q high–$\overline{Q}$ low). The high Q output of FF1 extends to the input to I7, which has no effect at this time since counter CN1 is not being used. The high Q output of FF1 also extends to the upper input to G7, which has no effect since counter CN2 is not being used. The high Q output of FF1 renders high the next-to-lower input to the clock gate G12. The high upper input to G6 extends through I11 as a high-to-low transition at the input to SS2, which thereupon produces a 12 $\mu$s low output pulse. The 12 $\mu$s low pulse from SS2 is effective through I12 and I13 to hold low for 12 $\mu$s the upper input to G12. The high-to-low change of the $\overline{Q}$ output of FF1 is effective through I14 and DEL3 to render high the lower input to G6 after a delay of 0.3 $\mu$s. At the end of the 0.3 $\mu$s delay, the output of G6 will go low. The high-to-low transition at the output of G6 is effective to cause SS9 to produce a 25 $\mu$s low output pulse, which is effective through I39 as a 25 $\mu$s high pulse at the upper input to G34. The high output of I10 is effective through contact F4–5 to make the lower input to G7 high and the next-to-upper input to G12 high. The circuit remains in this condition until the end of the 12 $\mu$s low output pulse from SS2.

At the end of the 12 $\mu$s low output pulse from SS2, the output of I12 goes from high-to-low to energize single-shot SS8 to produce a 0.75 $\mu$s low output pulse, which is effective through I38 and G34 as a 0.75 $\mu$s low pulse on lead 285, into FIG. 28 and through G32 and G33 and a 0.75 $\mu$s low pulse at the CD inputs to counters CN3, CN4 and CN5, which thereupon are directly cleared to zero counts (all Q1, Q2, Q4 and Q8 outputs low). At the end of the 0.75 $\mu$s low from G34 in FIG. 27, the output of G34 will return to high.

Also, at the end of the 12 $\mu$s low output from SS2 in FIG. 27, the output of I13 returns to high at the upper input to G12. Gate G12 is thus enabled (highs on its upper three inputs) to pass clock pulse transitions from the 10 kHz. clock through I18 and switch RS1 to lead 272 at the input to SS4. The output of G12 will have been high until its upper input is made high from I13 (at the end of the 12 $\mu$s interval): if the click is high at that time, G12 will produce a high-to-low output clock pulse transition: if the clock is low at that time, G12 will not produce a high-to-low output clock pulse transition until the next low-to-high transition from the 10 kHz. clock source. If the DIAL PULSE INPUT of FIG. 27 is synchronized with the clock, the latter will be low when G12 is enable, thus to inject a maximum delay of perhaps 50 $\mu$s (assuming a clock output of 50 $\mu$s low and 50 $\mu$s high) before G12 produces a "clock pulse" output: if the DIAL PULSE INPUT is not synchronized with the clock, such as to be high when G12 is enabled, there could possibly be a delay of 12 $\mu$s before G12 produces a "-clock pulse" output. A similar error could occur at the trailing edge of the measured pulse. The overall possible error is less than 1/5 percent when measuring intervals of the order of 100 ms and around 1/20 percent when measuring intervals of the order of 1000 ms. These orders of error magnitude are not significant: thus, while synchronous operation is desirable, it is not essential.

At once (when G12 is enabled at the end of the 12 $\mu$s interval) or eventually (when the 10 kHz. clock goes from low-to-high), gate G12 will produce a high-to-low output transition, which is effective through I18 as a low-to-high transition on lead 272 into FIG. 28 and through contact F4–8 at the CP input to counter CN6. Counters CN6, CN7 and CN8 will down-count one count for each low-to-high transition at their CP inputs when their PS and CL–inputs are high. The first low-to-high clock pulse at the CP input to CN6 will thus cause CN6 to down-count from its starting count of nine to the count of eight (Q1, Q2 and Q3 low–Q8 high).

At he end of the 0.75 μs interval from SS8 in FIG. 27, which is 0.75 μs after the upper three inputs to G12 are enabled, the lower input in FIG. 27 to G34 returns to low and the output of G34 returns to high on lead 285 into FIG. 28, where it is effective through G32 and G33 to return to high the CD inputs to the cleared counters CN3, CN4 and CN5. With their CD and SD–inputs high, counters CN3, CN4 and CN5 can up-count responsive to high-to-low transitions at their CP inputs. Eventually, the 25 μs low output pulse from SS9 in FIG. 27 ends to return the output of I39 to low at the upper input to G34.

When the 10 kHz. clock provides a high-to-low transition (at the end of each high 10 kHz. clock pulse), the output of G12 in FIG. 27 provides a low-to-high transition, which is effective through I18 and switch RS1 as a high-to-low transition on lead 272 at the input to SS4. The high-to-low transition on lead 272 into FIG. 28 will have no effect on counter CN6. However, this transition at the input to SS4 in FIG. 27 causes SS4 to produce a 1 μs low output pulse, which is effective through I19 and G13 (lower input high on lead 276 from the high Q output in FIG. 28 of FF2) as a 1 μs low pulse on lead 274 into FIG. 28 and through contact F4–7 at the CP input to counter CN3. Counter CN3 responds to this high-to-low "-clock pulse" at its CP input to up-count from the count of zero (Q1, Q2, Q4 and Q8 low) to the count of one (Q1 high–Q2, Q4 and Q8 low).

Thus, the leading edge (low-to-high) of each high clock pulse from the 10 kHz. clock is used to down-count one count in the upper register of FIG. 28 and the trailing edge (high-to-low) of each high clock pulse is used to up-count one count in the lower register of FIG. 28.

DURING THE FIRST HIGH BREAK

It will be apparent from the previous description that throughout the duration of the first high break interval from the DIAL PULSE INPUT of FIG. 27, the upper register (counters CN6, CN7 and CN8) in FIG. 28 will down-count the leading edge (low-to-high) of each high clock pulse, while the lower register (counters CN3, CN4 and CN5) in FIG. 28 will up-count the trailing edge (high-to-low) of each high clock pulse. At the clock frequency of 10 kHz., counters CN3 and CN6 up-count and down-count at the rate of tenths of milliseconds. Each time counter CN6 down-counts from zero to nine, its Q8 output provides a low-to-high transition to the CP input to counter CN7: counter CN7 thus down-counts at the rate of units of milliseconds. Likewise, counter CN8 down-counts at the rate of tens of milliseconds Each time counter CN3 up-counts from nine to zero, its Q8 output provides a high-to-low transition, which is effective through I22 and G17 as a high-to-low transition at the CP input to counter CN4: counter CN4 thus up-counts at the rate of units of milliseconds. Likewise, counter CN5 up-counts at the rate of tens of milliseconds.

If the DIAL PULSE INPUT of FIG. 27 is synchronized with the 10 kHz. clock, the upper register will down-count the same number of clock pulses as are up-counted in the lower register. If nonsynchronous operation is involved, the down-counting and up-counting may differ by perhaps one clock pulse count, which may inject an error of perhaps 1/10 of a millisecond or 0.01 percent in the range of 100 ms time interval measurements.

TRAILING EDGE OF FIRST BREAK

When the DIAL PULSE INPUT of FIG. 27 changes its output from the high break to the low make, the following circuit functions occur:

(1) down-counting in the upper register and up-counting in the lower register are stopped;

(2) the upper register is preset to its maximum count of 15 (Q1, Q2, Q4 and Q8 high);

(3 ) the count in the lower register is transferred to the upper register and is retained in the lower register; and, (4) the carry flip-flop FF2 is set (Q high) if necessary.

The change from the high break to the low make at the upper input to G6 in FIG. 27 produces a high output from G6, which results in a low output from I10 over contact F4–5 to the next-to-upper input to gate G12. This forces the output of G12 to be high and the output of I18 to be low. If the 10 kHz. clock were low when the input change occurs, the output of I18 would be low and would not change; thus, the lower register would have up-counted the last high-to-low clock pulse transition from I18. This is what would be the case if the dial pulse input were synchronized with the clock. If, however, the 10 kHz. clock were high when the input change occurs, the break-to-make transition would force the output of I18 to go from high-to-low to put one more count in the lower register. This is what could happen under nonsynchronous operation.

With the output of I18 held low, no further clock pulses will be down-counted in the upper register or up-counted in the lower register. For example, assume that during the first break the lower register was up-counted to a count of 593, representing 59,3 ms. Counter CN5 will be set to a count of 5 (Q1 and Q4 high–Q2 and Q8 low), counter CN4 will be set to a count of 9 (Q1 and Q8 high–Q2 and Q4 low), and counter CN3 will be set to a count of 3 (Q1 and Q2 high–Q4 and Q8 low). The setting of the upper register is not of consequence—as a matter of interest, assuming a down-count of 593 from the starting count of 999, the upper register will be at a count of 406.

The high-to-low output from I10 is effective through contact F–6 to cause regeneration circuit REG to produce a 10 μs low output pulse to the input to single-shot SS3 and to the middle input to gate G8. This 10 μs interval provides a time during which each counter of the upper register is preset to its maximum count of 15, the count of 593 is transferred from the lower register to the upper register, the 593 count in the lower register is retained therein, and the carry flip-flop FF2 of FIG. 28 is put (or kept) in its set condition (Q high). These operations arrange the circuit for measuring the next high break interval, as will be described.

The 10 μs low at the middle input to gate G8 in FIG. 27 causes the output of G8 to go high for 10 μs on lead 275 into FIG. 28, where DEL4 delays the low-to-high leading edge of the 10 μs pulse for 0.3 μs and then makes the left input to G14 high for 9.7 μs (the balance of the 10 μs interval). The 0.3 μs delay is to prevent the inadvertent enabling of G14 for at least that amount of time. The high-to-low input to SS3 in FIG. 27 (the leading edge of the 10 μs low pulse from REG) causes single-shot SS3 to produce a 5 μs low output pulse, which causes G10 to produce a 5 μs high pulse, which causes I20 to produce a 5 μs low pulse on lead 273 into FIG. 28 (1) to the input to I21, (2) to the right input to G14, and (3) to the upper input to G30. The 5 μs low at the upper input to G30 is effective through G30 and I36 to hold low for 5 μs the K input to the carry flip-flop FF2, thus to prevent FF2 from changing state for at least 5 μs. The 5 μs low at the input to I21 in FIG. 28 produces a 5 μs high at the input to DEL5, which delays the low-to-high transition for 0.6 μs and then causes the output of G15 to go low for 4.4 μs (the balance of the 5 μs interval). The 4.4 μs low pulse from G15 is applied to the PS inputs to counters CN6, CN7 and CN8 to preset each of these counters its maximum count of 15 (Q1, Q2, Q4 and Q8 high). At the end of the 4.4 μs preset interval, the output of I20 (FIG. 27) returns to high, the output of G15 (FIG. 28) returns to high, and the K input to FF2 (FIG. 28) returns to high.

When the output of I20 (FIG. 27) returns to high (at the

In the assumed case where the second break was 61.5 ms compared to the first break of 59.3 ms, the lower register will end up with a count of 593 and the upper register will end up with a count of 978 (999 less 21, which is the remainder of 615 over and above the 594 which changed the upper register from 000 to 999).

SECOND BREAK NOT LONGER THAN FIRST BREAK

From the foregoing, it will be apparent that clock pulses will be up-counted from 000 in the lower register of FIG. 28 until the down-count in the upper register of FIG. 28 goes from 000 to 999, if ever. Thus, if the second break is equal to the first break (a count of 593) or is of less duration than the second break (a count of less than 593), the upper register count will never be down-counted from 000 to 999. Thus, the carry flip-flop FF2 of FIG. 28 will not be cleared, the Q output of FF2 will remain high, and the gate G13 in FIG. 27 will not be disabled. As a consequence, the lower register will count all of the clock pulses occurring during the second break (593 or less), which count will represent the minimum (so far) break time.

END OF SECOND BREAK

At the end of the second input break interval, the low output in FIG. 27 of I10 is effective through contact F4-5 to hold low the next-to-upper input to G12, thus to stop the supply of clock pulses to both the upper and lower registers of FIG. 28. At that time, the lower register will contain a count indicative of the minimum (so far) break interval.

The high-to-low transition at the output in FIG. 27 of I10 causes the regeneration circuit REG to produce the previously described 10 $\mu s$ low output pulse. As discussed hereinbefore, the 10 $\mu s$ low output pulse from REG is effective (1) to produce from G15 in FIG. 28 a 4.4 $\mu s$ low for presetting the counters of the upper register to their maximum counts of 15, (2) to transfer the lower register count into the upper register, (3) to retain the count in the lower register, and (4) to reset the carry flip-flop FF2 of FIG. 28 with its Q output high.

SUBSEQUENT BREAK INTERVALS

As previously described, the leading edge of each successive high input break interval (1) enables G12 of FIG. 27 to supply clock pulses to both registers and (2) clears the lower register to zero count before allowing clock pulses to be up-counted therein.

The readout circuits NX3, NX2 and NX1 of FIG. 28 will indicate the minimum break time as transferred to the upper register.

The circuit action will stop if (1) the DIAL PULSE INPUT of FIG. 27 returns its output to a steady low make or if (2) the switch S1 in FIG. 27 is returned to its STOP/READ position as shown.

DIAL PULSE INPUT RETURNS TO STEADY MAKE

In the DIAL PULSE INPUT of FIG. 27 ceases to supply high break intervals, thus returning its output to a steady low make, the circuit will end up in the condition previously described as prevailing during each low make after the 10 $\mu s$ interval from REG in FIG. 27. The circuit merely awaits another high break which does not appear.

MANUAL STOP

The operation of the switch S in FIG. 27 to its position shown in the drawing will stop the circuit action even though the DIAL PULSE INPUT of FIG. 27 may continue to supply break and make intervals.

When switch S is moved to its downward position (where it will stay locked), the upper input to G1 goes high and the input to I1 goes low. Again, the flip-flop effect of G1 and I1 will disregard chatter at contact 1 provided contact 2 remains high. This will cause lead 277 at the output of I1 to go from low to high. I2 will cause the left input to collector tie CT1 to go low to make its output low at the input to I5. The output of I5 goes high to cause the output of G4 to be low. The low output of G4 holds the output of CT1 low and is effective through contact F4–1 to hold low the D input to the input flip-flop FF1.

With the D input to FF1 low, the first low-to-high transition at the CP input will clear FF1 to its zero state (Q low–$\overline{Q}$ high). This low-to-high transition occurs at the leading edge of the next input break interval when the output in FIG. 27 of the DIAL PULSE INPUT goes to a high break condition at the end of the previous low make. When this occurs, the low-to-high transition is effective through contacts F4–4 and F4–2 at the CP input to FF1 to clear it (Q low–$\overline{Q}$ high). The low Q output from FF1 extends to the next-to-lower input to G12 to disable G12 from passing any further clock pulses. The high $\overline{Q}$ output of FF1 is effective through I14 and DEL3 to at once apply a high-to-low transition to the lower input to REG. The low output of DEL3 is also effective at the lower input to G6 to disable G6 by holding its output high. The high-to-low output from I10 also energizes REG.

Regeneration circuit REG, upon being energized, produces the previously described 10 $\mu s$ low pulse (1) for presetting each of the counters of the upper register to maximum (15) count, (2) for transferring the lower register count to the upper register, (3) for retaining the count in the lower register, and (4) for resetting (if necessary) the carry flip-flop FF2 of FIG. 28.

The circuit will not measure any more break intervals, even though they may still be supplied by the DIAL PULSE INPUT of FIG. 27, until switch S is again moved to its upper position in FIG. 27.

AUTOMATIC STOP

The previous description assumed that in FIG. 27 the BCD–switches were in the position shown to enable the circuit to process input information continuously until stopped either (1) by the DIAL PULSE INPUT providing a continuous low make input or (2) by the manual operation of the switch S to its STOP/READ position (lower contact 1). Under those circumstances gate G5 in FIG. 27 was disabled (steady high output) by virtue of the permanent low ground on its upper input, over contact F4–3, lead 270 and the wiper of switch BCDO, thus to hold the output of I9 permanently low on lead 279.

This low on lead 279 held the outputs of I3 and I6 high, which respectively held high one of the inputs to respective collector ties CT1 and CT3. The right input to collector tie CT1 was held high from the output of G4: the left input to collector tie CT1, and thus its output, was controlled solely by the output of I2, which, in turn, was controlled only by the states of G1 and I1 according to the position of switch S. The right input to collector tie CT3, and thus its output, was controlled only by I4, which caused the output of CT3 to be low (to hold the input flip-flop FF1 cleared, Q low—$\overline{Q}$ high) during the 25 $\mu s$ initializing time and caused the output of CT3 to be high during the continuous processing operation.

The low on lead 279 also held high the output of I8 at the lower input to collector tie CT2. This, in turn, placed the output of CT2 under the sole control of I7, which is controlled from the Q output of FF1. When the circuit is initialized, as previously described, flip-flop FF1 is cleared (Q low-$\overline{Q}$ high) and its low Q output is effective through 17 as a high at the left input to CT2: the output of CT2 is thus high and is effective through DEL2 to keep high the R9(1) input to counter CN1. The high R9(1) input keeps counter CN1 at a count of nine (A and D high–B and C low). As soon as flips-flop FF1 is set (Q high–$\overline{Q}$ low) to allow input pulse processing, its high Q output renders the output of DEL2 low at once at the R9(1) input to counter CN1, thus to allow counter CN1 to respond to high-to-low transitions at its CP input. During input pulse processing, as previously discussed, the low-to-high leading edge of each high input break interval is effective to produce at the output of G6 (at the CP input to counter CN1) a high-to-low transition. This high-to-low transition causes counter CN1 to count end of the 4.4 μs preset interval), both inputs to gate G14 in FIG. 28 will be high, one from I20 (FIG. 27) over lead 273 and one from DEL4 (FIG. 28), thus to cause the output of G14 to go low for the last 5 μs of the 10 μs interval. The high-to-low transition at the output of G14 energizes single-shot SS6 to cause the output of G16 to produce onto the transfer lead 282 a 2 μs high pulse. The 2 μs high pulse on lead 282 is applied through I35 as a 2 μs low pulse at the SD input to FF2 to set it (or hold it set) in its one state (Q high). The high Q output from FF2 extends over lead 276 into FIG. 27 to the lower input to G13 to maintain G13 enabled.

While the carry flip-flop FF2 is being set (or held set), the same 2 μs high pulse on lead 282 enables the transfer gates G18 through G29 of FIG. 28 to transfer to the upper register the count then in the lower register. Counter CN3 (set to a count of (3) has its Q1 and Q2 outputs high and its Q4 and Q8 outputs low. With the PS input to counter CN6 now high, and with counter CN6 preset at 15 (Q1, Q2, Q4 and Q8 high), the lows at the Q4 and Q8 outputs of CN3 will cause the outputs of gates G20 and G21 to go low at the CL4 and CL8 inputs to CN6, and the highs at the Q1 and Q2 outputs of CN3 will cause the outputs of G18 and G19 to remain high at the CL1 and CL2 inputs to CN6. The lows on the CL4 and CL8 inputs to CN6 will clear those two cells to cause the outputs Q4 and Q8 of CN6 to go low; and, the highs on the CL1 and CL2 inputs to CN6 will keep those cells set with the Q1 and Q2 outputs of CN6 high. Thus, counter CN6 ends up with a count of three (Q1 and Q2 high—Q4 and Q8 low) as in counter CN3. Likewise, the count of 9 in counter CN4 is transferred to counter CN7 since the lows on outputs Q2 and Q4 of counter CN4 will be effective as lows at the CL2 and CL4 inputs to counter CN7, thus to clear the middle two cells to Q2 and Q4 low, leaving Q1 and Q8 high. Also, the 5 in counter CN5 is transferred in the same manner to counter CN8, leaving the Q1 and Q4 outputs of CN8 high and the Q2 and Q8 outputs of CN8 low.

At the end of the 2 μs interval from single-shot SS6 of FIG. 28, the output of SS6 returns to high, the output of G16 on lead 282 returns to low, and the output of I35 at the SD input to FF2 returns to high. At the end of the 10 μs interval from the regeneration circuit REG of FIG. 27, the output of REG returns to high, the output of G8 returns to low, on lead 275 into FIG. 28, the output in FIG. 28 of DEL4 returns at once to low, and the output of G14 returns to high.

As a result of the foregoing, the circuit is returned to its steady state condition with the output in FIG. 27 a low make from the DIAL PULSE INPUT. The circuit awaits the leading edge (low-to-high) of the second input high break interval for measuring the second break time. The upper and lower registers of FIG. 28 contain the same 10 kHz. clock pulse count of 593: with the decimal point lamp DECPT of FIG. 28 lit and physically located between NX2 and NX1, and reading the upper register from right-to-left, the readout circuits will display the first break time as 59.3 ms as the minimum (first one so far) break.

START OF THE SECOND BREAK INTERVAL

When the second break interval occurs from the DIAL PULSE INPUT of FIG. 27, the output of I11 will go low to cause single-shot SS2 to produce a 12 μs low output pulse, which is effective through I12 and I13 to hold the upper input to G12 low for 12 μs and then to return it to high. Also, the output of G6 goes low, which is effective through I10 and contact F4—5 to make to next-to-upper input to G12 high. Also, the 12 μs high from I12 holds the input high to single-shot SS8 for 12 μs. Also, the high-to-low output transition from G6 causes single-shot SS9 to produce a 25 μs low output pulse, which is effective through I39 to hold the upper input to G34 high for 25 μs.

At the end of the 12 μs interval from single-shot SS2 of FIG. 27, the lower register of FIG. 28 is cleared to zero count. When the output of SS2 returns to high at the end of the 12 μs interval, the low-to-high transition is effective through I12 as a high-to-low transition at the input to SS8 to cause SS8 to produce a 0.75 μs low output pulse, which is effective through I38, G34, lead 285 into FIG. 28, G32 and G33 as a 0.75 μs low pulse at the CD inputs to counters CN3, CN4 and CN5 to clear these counters to zero count (all Q1, Q2, Q4 and Q8 outputs low). At the end of the 0.75 μs interval, the output in FIG. 27 of SS8 returns to high, to, in turn, make the outputs again low from I38, high from G34 on lead 285 into FIG. 28, low from G32 and high from G33 at the CD inputs to counters CN3, CN4 and CN5.

In FIG. 27, at the end of the 12 μs interval from SS2, the upper input to G12 is returned to high to allow G12 to pass 10 kHz. clock pulses again. The low-to-high leading edge of each high clock pulse is effective, as previously described, through G12, I18, switch RS1 on lead 272 into FIG. 28, and through contact F4—8 as a low-to-high transition at the CP input to counter CN6, which thereupon down-counts the leading edges of the high clock pulses. The high-to-low trailing edge of each high clock pulse is effective, also as previously described, through G12, I18, switch RS1, SS4, I19, G13 on lead 274 into FIG. 28, and through contact F4—7 as a 1 μs low pulse at the CP input to counter CN3, which thereupon up-counts the trailing edges of the high clock pulses.

When the 25 μs interval from SS9 in FIG. 27 ends, the output from SS9 returns to high and the output from I39 returns to low at the upper input to G34.

The circuit remains in the above condition with the upper register down-counting clock pulses and the lower register up-counting clock pulses. It will be recalled that the starting count in the upper register was 593 and the starting count in the lower register was 000 (having been cleared during the 0.75 μs interval from SS8 in FIG. 27 at the leading edge of the second input high break interval).

With the starting count of 593 in the upper register (the measure of 59.3 ms for the first break), it will require 593 clock pulses to down-count (dissipate) the count to 000 in the upper register. Thus, if the second break is equal to or of less duration than the first break, the count in the upper register will not be driven past zero count (000) to 999, etc.; but, if the second break is of longer duration than the first break, the upper register will be driven to zero count (000), then to 999, then to 998, 997, etc. to some lower value depending upon how long the second break lasts.

SECOND BREAK LONGER THAN FIRST BREAK

If it be assumed, for purposes of explanation, that the second break is longer (say 61.5 ms) than the first break (59.3 ms), the lower register will up-count from 000 to 593 while the upper register down-counts from 593 to 000. Up to that point, the high Q output of the carry flip-flop FF2 in FIG. 28 extends over lead 276 into FIG. 27 to the lower input to G13, thus enabling G13 to pass over lead 274 the 1 μs "clock pulses" from SS4.

At the leading edge of the 594th high clock pulse, the upper register will be driven from the count of zero (000) to the count of 999, thus producing a 1 μs high pulse from the A output on lead 284 in FIG. 28 from counter CN8. This 1 μs high pulse on lead 284 appears at the CP input to FF2 where the high-to-low trailing edge is effective to cause FF2 to be cleared (its Q output goes from high to low). The low Q output from FF2 extends over lead 276 into FIG. 27 to disable gate G13 such that no more (in excess of the 593 already counted) clock pulses are up-counted in the lower register, which thus contains a count of the minimum break so far.

The upper register will continue to down-count during the remainder of the second break, until the high-to-low break-to-make transition occurs from the DIAL PULSE INPUT in FIG. 27. When that occurs, the output of G6 goes high, and the output of I10 goes low through contact F4—5 at the next-to-upper input to G12, thus to disable G12 and so to block any further clock pulses from the CP input in FIG. 28 to counter CN6 of the upper register.

one pulse to advance from the count of nine (A and D high—C and B low) to the count of zero (A, B, C and D low). In response to each such high-to-low transition at its CP input, counter CN1 will advance one count. Thus, from its starting count of nine, the first break input causes counter CN1 to advance to zero, the second break input causes counter CN1 to advance to one, etc., and the counter CN1 will arrive at the count of eight at the leading edge of the ninth input break and at the count of nine at the leading edge of the tenth input break.

The BCD-switches in FIG. 27 are set at the number of break intervals to be measured before an automatic stop. If, for instance, it is desired to measure a series of six break intervals, the BCD-switches will be set on contacts 6: this will stop the circuit when counter CN1 arrives at a count of 6, which will be at the leading edge of the seventh break interval. The four diodes D1, D2, D4 and D8 are connected to the respective outputs A, B, C and D of counter CN1 and to the contacts of the BCD-switches such that lead 270 connected to the wipers of all of the BCD-switches will be low if any connected (through switches BCD—) diode is held low at any one or more of the A, B, C, D outputs of counter CN1 and will be high only if all connected diodes are held high from the A, B, C, D outputs of counter CN1. With the wipers held low, the circuit functions continuously, just as in the case previously described when wiper BCD0 was grounded (low) on its (0) contact. With switches BCD— set on 6, for an automatic stop after measuring six break intervals, only diodes D2 and D4 are connected (through switches BCD2 and BCD4) to the common wiper lead 270 and through contact F4-3 to the upper input to gate G5. From the starting count of nine in counter CN1 (A and D high-B and C low), at least one of the outputs B and C always will be low until the counter CN1 arrives at the count of (6) (the leading edge of the seventh break input). The circuit will thus process input information continuously through the first six input break intervals.

When counter CN1 arrives at the count of six, at the leading edge of the seventh input break interval, the upper input to gate G5 is changed from low to high since both of the B and C outputs of counter CN1 are high. The lower input to G5 is being held low from I16 due to the normal high output from the delayed single-shot DELSS1. At the leading edge (low-to-high transition) of the seventh break input, I11 provides a high-to-low output which energizes DELSS1, which provides a 1 $\mu$s low output pulse delayed 1 $\mu$s. This delayed 1 $\mu$s low pulse is effective through I16 as a 1 $\mu$s high pulse at the lower input to G5, which thereupon provides a 1 $\mu$s low output pulse to produce at the output of I9 a 1 $\mu$s high pulse on lead 279.

The 1 $\mu$s high pulse on lead 279 is effective through I6 and CT3 (as a 1 $\mu$s low pulse at the CL input to FF1) to clear the input flip-flop FF1 (Q low—$\overline{Q}$ high) and is effective through I3 and CT1 (as a 1 $\mu$s low pulse input to I5 and a 1 $\mu$s high output from I5) to cause the D input to FF1 to be low, which holds the output of CT1 low. Also, the 1 $\mu$s high pulse on lead 279 is effective at once through I8, CT2 and DEL2 to hold the R9(1) input to counter CN1 low for at least 1 $\mu$s. The low Q output of the cleared FF1 is effective through I7 as a high input to CT2 to allow the output of collector tie CT2 to go high as soon as the 1 $\mu$s clearing operations regarding I5, G4 and FF1 are finished. This high at the output of CT2 is then delayed 0.2 $\mu$s in DEL2 and is then applied as a low-to-high transition to the R9(1) input of counter CN1 to reset it to its starting count of nine.

At the end of the 1 $\mu$s stopping pulse on lead 279, lead 279 returns to a low condition. This low on lead 279 renders high the outputs of I3 and I6. The output of collector tie CT1 is held low from the low output of G4, whose upper input is held high from SS1 and whose lower input is held high from the output of I5, whose input is low at the output of CT1.

With the input flip-flop FF1 cleared (Q low—$\overline{Q}$ high) and with the D input to FF1 held low, FF1 will stay in its cleared condition until switch S in FIG. 27 is moved to its STOP/READ position (downward) and then back to its CLEAR/START position (upward). Such manipulation of switch S, as previously described, will produce a high-to-low transition on lead 277 to cause single-shot SS1 to produce the 25 $\mu$s low clearing pulse, which, in turn, will cause the output of G4 to go high to enable FF1 to be set (Q high—$\overline{Q}$ low) at the leading edge of the first subsequent high break interval to be measured.

MEASURING INTERVALS GREATER THAN 99.9 ms

In the previous description it was assumed that intervals less than 100 ms were to be measured. Consequently, in FIG. 27 switch RS1 was operated to the lower contact and switch RS2 in FIG. 28 was moved to the left position. With switch RS1 in its lower position, the 10 kHz. clock was gated through G12, I18 and switch RS1 to lead 272 and to the input to single-shot SS4. Under those circumstances, each 10 kHz. clock pulse represented 0.1 ms of timing and the upper and lower registers of FIG. 28 down-count and up-count tens, units and tenths of ms with the decimal point lamp DECPT in FIG. 28 lit to provide the decimal point between the units readout of NX2 and the tenths readout of NX1.

If switches RS1 and RS2 of FIGS. 27 and 28 are operated to their respective upper and right contacts, the circuit is adjusted to use counter CN2 of FIG. 27 to provide 1 kHz. clock pulses on its C output, over switch RS1, to lead 272, and to single-shot SS4. Each 1 kHz. clock pulse represents 1.0 ms of timing and the upper and lower registers will indicate hundreds, tends and units of ms with the decimal point lamp DECPT extinguished.

With counter CN2 of FIG. 27 connected as shown, it acts as a binary-coded decimal counter. If input R9(1) is high, the counter is adjusted to a count of nine (C low). When input R9(1) is low, then high-to-low pulses on the CP input will cause the counter to count from 9 to 8 to 7 to 6 to 5 to 4 to 3 to 2 to 1 to 0 to 9 to 8, etc. Upon initializing the circuit, as will be recalled, the input flip-flop FF1 is cleared (Q low—$\overline{Q}$ high). The low Q output of FF1 is applied to the upper input to G7, whose resulting high output is effective through DEL1 (after a delay of 0.3 $\mu$s) to make high the input R9(1) to counter CN2 to cause counter CN2 to go to a count of nine (C low) and stay there until the high is removed from the R9(1) input. The lower input to gate G7 is also made low from the output of I10 until gate G6 is enabled to pass dial pulse transitions to the circuit for measurement. As previously discussed, at the end of the 25 $\mu$s initializing pulse from SS1 in FIG. 27, flip-flop FF1 will respond to the first low-to-high leading edge break interval input to be set (Q high—$\overline{Q}$ low). The high Q output of FF1 makes the upper input to gate G7 high. The low $\overline{Q}$ output of FF1 is effective as a high through I14 and DEL3 (after a delay of 0.3 $\mu$s) to enable gate G6 to provide a low output: thereupon, I10 makes the lower input to gate G7 high and the output of gate G7 low, which is effective at once through DEL1 to apply a low to input R9(1) of counter CN2. High-to-low clock pulse (10 kHz.) transitions at the CP input to counter CN2 cause the counter to count each 10 kHz. clock pulse. Whenever output C of counter CN2 carries a low-to-high transition, such is effective through switch RS1 as a 1 kHz. clock pulse on lead 272 and at the input to SS4. From its starting count of nine (C low), the counter CN2 will cause output C to go from low-to-high when the count advances from a count of 3 to a count of 4: at all other times output C is either low, or high, or changes from high-to-low. Thus, output C of counter CN2 will produce 1 kHz. clock pulses. At the end of each high break interval, the output of I10 will drive the lower input to G7 from high-to-low to produce a high output from G7 during the low make input: The high output from G7 is delayed 0.3 $\mu$s in DEL1 and then causes counter CN2 to be reset to the count of nine and to stay there until input R9(1) is made low at the start of the next high break input to be measured.

The rest of the circuit functions as previously described for measurement of intervals of less duration than 100 ms under control of the 10 kHz. clock pulses.

It is to be understood that the above-described arrangement is illustrative of the application of the principles of the invention. Numerous other arrangements may be devised by those skilled in the art without departing from the spirit and scope of the invention.

What I claim is:

1. Circuitry for measuring the minimum time interval between pairs of signals among a plurality of such pairs comprising:

A. a source of pulses recurring at a constant frequency substantially greater than the recurrence frequency of the two signals of each pair;
B. a first pulse count register;
C. a second pulse count register;
D. means for causing pulses from the source to be counted in the first register during the first time interval between the signals of a first pair;
E. means controlled by the later occurring signal of each pair for causing the second register to contain a starting pulse count equal to the pulse count then in the first register;
F. means controlled by each pair of signals succeeding the first pair for subtracting source pulses from the starting pulse count in the second register during the time interval between the signals of such succeeding pair;
G. and, means controlled by the second register during the time interval between the signals of such succeeding pair for causing the pulse count in the first register to equal the sum of all source pulses not exceeding the number required to reduce below zero the starting pulse count in the second register.

2. The invention defined in claim 1:

A. wherein is provided means controlled by the earlier occurring signal of each pair for causing the pulse count in the first register to equal zero;
B. and, wherein the means for causing the pulse count in the first register to equal the sum comprises means for causing the first register to count all source pulses not exceeding the number required to reduce below zero the starting pulse count in the second register.

3. The invention defined in claim 2 wherein:

A. the second register comprises a down-counter responsive to each pulse transmitted thereto to reduce by one the pulse count therein;
b. and, the means for subtracting source pulses from the starting pulse count in the second register comprises first gating means controlled by a pair of signals for allowing source pulses to be transmitted to the down-counter during the time interval between the signals of the pair.

4. The invention defined in claim 3 wherein:

A. the first register comprises an up-counter responsive to each pulse transmitted thereto to increase by one the pulse count therein;
B. and, the means for causing the first register to count all source pulses not exceeding the number required to reduce below zero the starting pulse count in the second register comprises second gating means controlled by the down-counter during the time interval between the signals of a pair for allowing to be transmitted to the up-counter all source pulses not exceeding the number required to reduce below zero the starting pulse count in the down-counter.

5. The invention defined in claim 4 wherein:

A. the down-counter includes means for providing a control signal upon the addition to the down-counter of a source pulse reducing below zero the pulse count therein;
B. and, the second gating means is controlled by the control pulse to prevent further source pulses from being transmitted to the up-counter.

6. The invention defined in claim 5 wherein:

A. the down-counter comprises a plurality of binary counting stages settable from zero pulse count to capacity pulse count upon the transmission thereto of a source pulse;
B. and, the means for providing a control signal comprises a control signal generator controlled by the down-counter to generate the control signal whenever the down-counter is set from zero pulse count to capacity pulse count.

7. The invention defined in claim 6 wherein:

A. the up-counter comprises a plurality of binary counting stages;
B. and, the means for causing the second register to contain a starting pulse count equal to the pulse count then in the first register comprises a plurality of transfer gates connected between the down-counter and the up-counter and controlled by the later occurring signal of each pair to transfer to the down-counter as a starting pulse count therein the pulse count then existing in the up-counter.

8. The invention defined in claim 7 wherein the first gating means comprises a first gate connected between the source of pulses and the down-counter.

9. The invention defined in claim 8 wherein the second gating means comprises a second gate connected between the first gate and the up-counter.

10. The invention defined in claim 7 wherein the means for causing source pulses to be counted in the first register during the first time interval between a first pair of signals comprises means effective prior to measurement of time intervals for registering capacity pulse count in the up-counter by setting all stages thereof to binary values representing capacity decimal pulse counts.

11. The invention defined in claim 10 wherein the means for causing source pulses to be counted in the first register during the first time interval between a first pair of signals also comprises means effective prior to measurement of time intervals for registering capacity pulse count in the down-counter by setting all stages thereof to binary values representing capacity decimal pulse counts.